United States Patent
Warshaw

(10) Patent No.: US 11,414,873 B2
(45) Date of Patent: Aug. 16, 2022

(54) WALL ATTACHMENT DEVICE FOR HANDRAIL AND HANDRAIL ASSEMBLY COMPRISING THE SAME

(71) Applicant: 9220-6820 Quebec Inc., Dorval (CA)

(72) Inventor: William Kell Warshaw, Montreal (CA)

(73) Assignee: 9220-6820 Quebec Inc., Dorval (CA)

( * ) Notice: Subject to any disclaimer, the term of this patent is extended or adjusted under 35 U.S.C. 154(b) by 178 days.

(21) Appl. No.: 16/646,588

(22) PCT Filed: Sep. 12, 2018

(86) PCT No.: PCT/CA2018/051130
§ 371 (c)(1),
(2) Date: Mar. 12, 2020

(87) PCT Pub. No.: WO2019/051593
PCT Pub. Date: Mar. 21, 2019

(65) Prior Publication Data
US 2020/0284040 A1    Sep. 10, 2020

Related U.S. Application Data

(60) Provisional application No. 62/557,524, filed on Sep. 12, 2017.

(51) Int. Cl.
*E04F 11/18*    (2006.01)
*A47K 17/02*    (2006.01)

(52) U.S. Cl.
CPC ...... *E04F 11/1804* (2013.01); *E04F 11/1808* (2013.01); *A47K 17/022* (2013.01);
(Continued)

(58) Field of Classification Search
CPC ... E04F 11/18; E04F 11/1802; E04F 11/1804; E04F 11/181; E04F 11/1812;
(Continued)

(56) References Cited

U.S. PATENT DOCUMENTS

| | | | |
|---|---|---|---|
| 1,940,888 A | | 12/1933 | Smith |
| 4,361,314 A | * | 11/1982 | Ohlson ............... E01F 8/007 256/65.02 |

(Continued)

FOREIGN PATENT DOCUMENTS

| | | |
|---|---|---|
| AU | 2012206997 A1 | 2/2013 |
| CA | 1049997 A | 3/1979 |

(Continued)

OTHER PUBLICATIONS

International Search Report issued in International (PCT) Patent Application No. PCT/CA2018/051130 (dated Dec. 19, 2018).

(Continued)

*Primary Examiner* — Jonathan P Masinick
(74) *Attorney, Agent, or Firm* — Reising Ethington P.C.

(57) ABSTRACT

A wall attachment device for securing a handrail to a supporting wall, the handrail having a first end and a second end, at least one of the first and second ends being hollow and including an inner connecting member extending radially inwardly within the corresponding end, the device comprising: a body sized and shaped to be received in the corresponding end, the body including a planar rear face adapted to be positioned against the supporting wall, a front face opposite the rear face and a lateral face, the body further having at least one fastener opening to receive a fastener for securing the body to the supporting wall; and an outer connecting member extending radially outwardly from the lateral face for securely engaging the inner connecting member of the handrail to thereby attach the corresponding one of the first and second ends of the handrail to the supporting wall.

24 Claims, 20 Drawing Sheets

(52) U.S. Cl.
CPC ... *E04F 11/1834* (2013.01); *E04F 2011/1821* (2013.01); *F16B 2200/503* (2018.08)

(58) Field of Classification Search
CPC .............. E04F 11/1814; E04F 11/1817; E04F 2011/1819; E04F 2011/1821; A47K 17/022; A47K 3/003; A47K 2201/00; A47K 2201/02; F16B 2200/50; F16B 2200/503; F16B 2200/509
See application file for complete search history.

(56) References Cited

U.S. PATENT DOCUMENTS

| | | | | |
|---|---|---|---|---|
| 6,810,538 | B2 * | 11/2004 | Ouyoung | A47K 10/04 211/105.1 |
| 7,520,492 | B1 | 4/2009 | Lai | |
| 9,939,118 | B2 * | 4/2018 | Beck | F21V 17/105 |
| 2004/0265535 | A1 * | 12/2004 | Chen | A47K 10/04 428/99 |
| 2008/0080173 | A1 * | 4/2008 | Trimble | F21S 4/20 362/146 |
| 2012/0123896 | A1 * | 5/2012 | Prodanovic | G06Q 30/0621 705/26.5 |
| 2012/0131879 | A1 * | 5/2012 | Bergman | E04H 17/22 52/704 |
| 2015/0252569 | A1 * | 9/2015 | Warshaw | E04F 11/1834 403/205 |
| 2015/0259926 | A1 | 9/2015 | Chang | |
| 2019/0078334 | A1 * | 3/2019 | Warshaw | E04F 11/1804 |

FOREIGN PATENT DOCUMENTS

| | | | | |
|---|---|---|---|---|
| DE | 3132855 | A1 | 3/1983 | |
| DE | 4430117 | A1 | 3/1995 | |
| DE | 10101782 | A1 * | 10/2001 | .......... E04F 11/1804 |
| DE | 102016105617 | A1 * | 9/2017 | ............. A47K 3/003 |
| DE | 202018001125 | U1 * | 9/2018 | ........... E04F 10/005 |
| GB | 2400306 | A * | 10/2004 | ............ A47K 10/04 |
| GB | 2500020 | A | 9/2013 | |
| GB | 2580066 | A * | 7/2020 | .......... A47K 17/022 |
| JP | 08205987 | A * | 8/1996 | .......... A47K 17/022 |
| JP | 2004-238970 | A | 8/2004 | |
| KR | 100840624 | B1 * | 6/2008 | |
| KR | 20090122515 | A * | 12/2009 | |
| KR | 100966268 | B1 * | 6/2010 | |

OTHER PUBLICATIONS

Written Opinion issued in International (PCT) Patent Application No. PCT/CA2018/051130 (dated Dec. 19, 2018).
Search Report issued in corresponding European Patent Application No. 1885597.9 (dated Aug. 30, 2021).

* cited by examiner

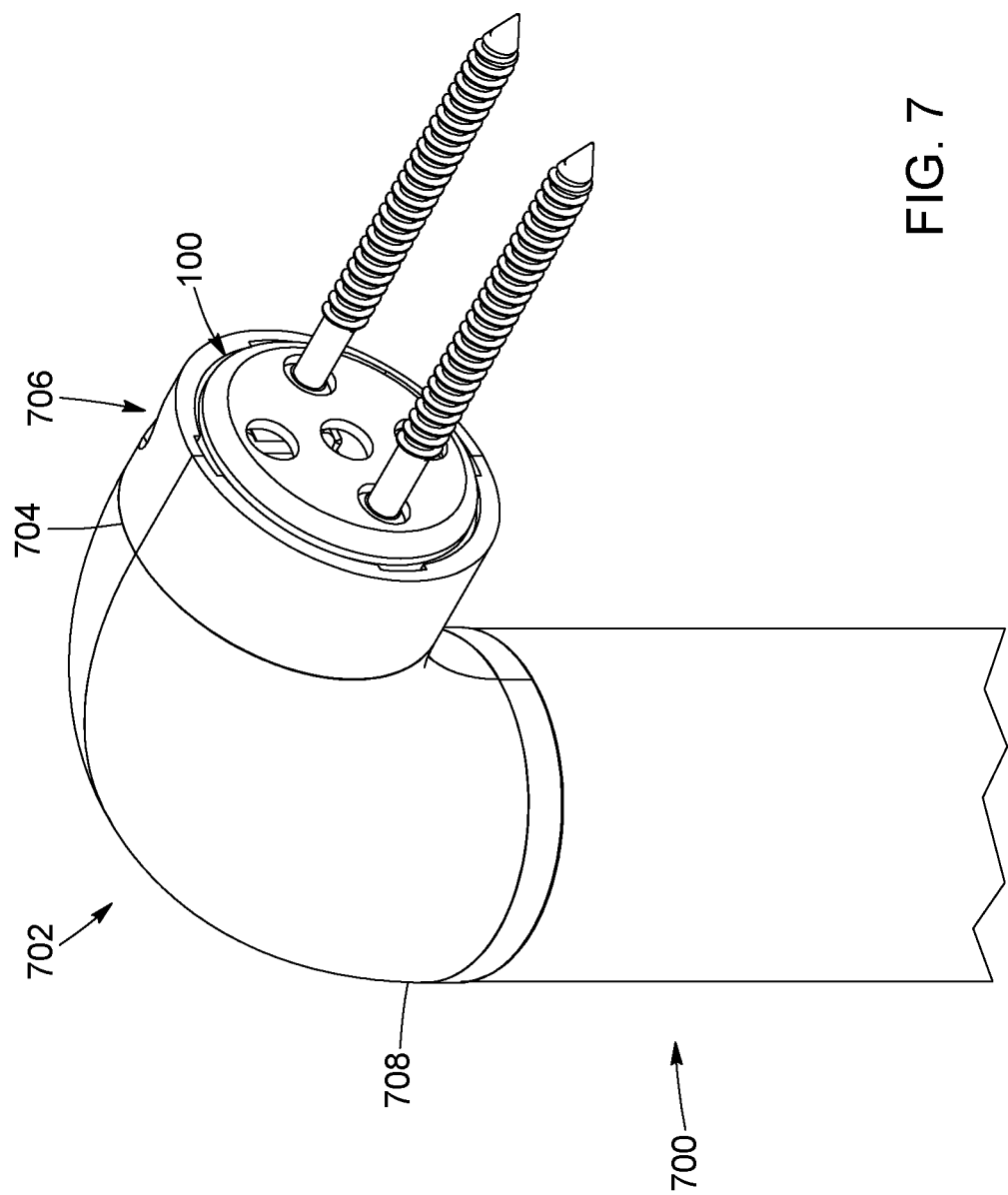

WALL ATTACHMENT DEVICE FOR HANDRAIL AND HANDRAIL ASSEMBLY COMPRISING THE SAME

RELATED PATENT APPLICATION

The present application claims the benefit of U.S. Provisional Application No. 62/557,524 filed on Sep. 12, 2017, the specification of which is incorporated herein by reference.

TECHNICAL FIELD

The technical field generally relates to handrails, and more precisely to wall attachments devices and assemblies for handrails, as well as handrail assemblies comprising wall attachment devices.

BACKGROUND

Handrails are adapted to be grabbed and/or held by the hand of a user to provide stability or support to the user. Handrails are commonly used on stairways, but can also be used in leveled areas such as along a corridor.

Handrails usually include an elongated body having a first end and a second end located opposite the first end. For aesthetic reasons, to comply with applicable regulations or for various other reasons, it may be desirable to connect one or both ends of the handrail to a wall such that there is no interruption between the end of the handrail and the wall. The wall may be a wall located near the end of the handrail, or may be the wall to which the handrail is mounted. It may also be desirable to mount the handrail to a wall such as a bathroom wall with both ends of the handrail connected to the wall to form a "grab bar".

To secure the end of the handrail to the wall, a flange extending radially from the end of the handrail is typically used. The flange could be integrally formed with the handrail or could be provided as a separate piece. The flange defines a surface parallel to the wall through which fasteners may be inserted to secure the end of the rail to the wall.

Unfortunately, the space on the wall around the end of the handrail may be limited, such that it may not be possible to use a flange to secure the end of the handrail to the wall. Furthermore, the flange may detract from the appearance of the wall and/or of the handrail.

Furthermore, to be able to withstand the weight of a person, the grab bar may need to be attached to wall studs, which are typically relatively narrow and for which the spacing between studs may vary from one wall to another. Unfortunately, in some existing grab bars, the flange is integral with the grab bar. In this case, the length of the grab bar and, therefore, the distance between the flanges is pre-determined and fixed, which means that it may not be possible to precisely align the flange with the corresponding studs to provide a secure wall attachment.

There is therefore a need for a device which will overcome at least one of the above-identified drawbacks.

SUMMARY

According to one aspect, there is provided a wall attachment device for securing a handrail to a supporting wall, the handrail having a first end and a second end, at least one of the first and second ends being hollow and including an inner connecting member extending radially inwardly within the corresponding one of the first and second ends, the device comprising: a body sized and shaped to be received in the corresponding one of the first and second ends, the body including a planar rear face adapted to be positioned against the supporting wall, a front face opposite the rear face and a lateral face, the body further having at least one fastener opening extending between the front and rear faces, each fastener opening being adapted to receive a fastener for securing the body to the supporting wall; and an outer connecting member extending radially outwardly from the lateral face for securely engaging the inner connecting member of the handrail to thereby attach the corresponding one of the first and second ends of the handrail to the supporting wall.

In one embodiment, the body includes: a flat base wall defining the rear and front faces of the body; and a sidewall extending away from the base wall, the sidewall being disposed away from the rear face so as to extend away from the supporting wall when the rear face is positioned against the supporting wall, the sidewall defining the lateral face.

In one embodiment, the handrail engagement member includes a rim surrounding the sidewall, the rim being spaced away from the base wall.

In one embodiment, the sidewall includes a first sidewall end located towards the base wall and a second sidewall end located away from the base wall, the rim being located at the second sidewall end.

In one embodiment, the sidewall has an S-shaped cross-section.

In one embodiment, the at least one fastener openings include a central fastener opening.

In one embodiment, the at least one fastener opening further includes a plurality of offcentered fastener openings disposed around the central fastener opening.

In one embodiment, each offcentered fastener opening has a first opening diameter and the central fastener opening has a second opening diameter larger than the first opening diameter.

In one embodiment, the plurality of offcentered fastener openings includes first, second, third and fourth offcentered fastener openings.

In one embodiment, the first offcentered fastener opening, the second offcentered fastener opening and the central fastener opening being disposed along a first axis.

In one embodiment, the third offcentered fastener opening, the fourth offcentered fastener opening and the central fastener opening being disposed along a second axis perpendicular to the first axis.

In one embodiment, the plurality of offcentered fastener openings includes first, second and third offcentered fastener openings.

In one embodiment, the first offcentered fastener opening and the central fastener opening are disposed along a first axis, the second offcentered fastener opening and the central fastener opening are disposed along a second axis and the third offcentered fastener opening and the central fastener opening are disposed along a third axis, the first, second and third axes being angled from each other at an angle of 120 degrees.

In one embodiment, the body is circular.

According to another aspect, there is also provided a wall attachment assembly for securing a handrail to a supporting wall, the handrail having a first end and a second end, the attachment assembly comprising: a connection collar including a first half portion and a second half portion adapted to be secured together for engaging one of the first and second ends of the handrail, the connection collar including an inner connecting member extending radially inwardly from at least one of the first and second half portions; a wall attachment device for connecting the connection collar to the supporting wall, the wall attachment device including: a body sized and shaped to be received in the connection collar, the body including a planar rear face adapted to be positioned against the supporting wall, a front face opposite the rear face and a lateral face, the body further having at least one fastener opening extending between the front and rear faces, each fastener opening being adapted to receive a fastener for securing the body to the supporting wall; and an outer connecting member extending radially outwardly from the lateral face for securely engaging the inner connecting member of the connection collar to thereby attach the corresponding one of the first and second ends of the handrail to the supporting wall.

In one embodiment, the body includes: a flat base wall defining the rear and front faces of the body; and a sidewall extending away from the base wall, the sidewall being disposed away from the rear face so as to extend away from the supporting wall when the rear face is positioned against the supporting wall, the sidewall defining the lateral face.

In one embodiment, the handrail engagement member includes a rim surrounding the sidewall, the rim being spaced away from the base wall.

In one embodiment, the sidewall includes a first sidewall end located towards the base wall and a second sidewall end located away from the base wall, the rim being located at the second sidewall end.

In one embodiment, the sidewall has an S-shaped cross-section.

In one embodiment, the at least one fastener openings include a central fastener opening.

In one embodiment, the at least one fastener opening further includes a plurality of offcentered fastener openings disposed around the central fastener opening.

In one embodiment, each offcentered fastener opening has a first opening diameter and the central fastener opening has a second opening diameter larger than the first opening diameter.

In one embodiment, the plurality of offcentered fastener openings includes first, second, third and fourth offcentered fastener openings.

In one embodiment, the first offcentered fastener opening, the second offcentered fastener opening and the central fastener opening being disposed along a first axis.

In one embodiment, the third offcentered fastener opening, the fourth offcentered fastener opening and the central fastener opening being disposed along a second axis perpendicular to the first axis.

In one embodiment, the plurality of offcentered fastener openings includes first, second and third offcentered fastener openings.

In one embodiment, the first offcentered fastener opening and the central fastener opening are disposed along a first axis, the second offcentered fastener opening and the central fastener opening are disposed along a second axis and the third offcentered fastener opening and the central fastener opening are disposed along a third axis, the first, second and third axes being angled from each other at an angle of 120 degrees.

In one embodiment, the body is circular.

In one embodiment, the connection collar includes a collar sidewall having a first end configured to be disposed towards the handrail and a second end adapted to be disposed towards the device, the connection collar further including an end wall extending orthogonally to the collar sidewall at the first end of the collar sidewall and an inner lip extending radially inwardly from the collar sidewall near the second end of the collar sidewall, the end wall and the inner lip being spaced apart to receive the outer connecting member therebetween.

In one embodiment, the assembly further comprises a base plate configured to be received between the supporting wall and the wall attachment device, the base plate including a central portion and a lateral portion extending radially outwardly from the central portion, the central portion including at least one fastener opening, the central portion being configured for receiving the rear face of the wall attachment device such that each fastener opening is aligned with a corresponding fastener opening of the wall attachment device.

In one embodiment, the base plate includes a central recess extending from the front plate face towards the rear plate face, the central recess being sized and shaped to matingly receive the wall attachment device.

In one embodiment, the connection collar has a first diameter and the lateral portion of the base plate has a second diameter larger than the first diameter.

According to yet another aspect, there is also provided a handrail assembly comprising: a handrail having a first end and a second end; a connection collar including a first half portion and a second half portion adapted to be secured together for engaging one of the first and second ends of the handrail, the connection collar including an inner connecting member extending radially inwardly from at least one of the first and second half portions; a wall attachment device for connecting the connection collar to a supporting wall, the wall attachment device including: a body sized and shaped to be received in the connection collar, the body including a planar rear face adapted to be positioned against the supporting wall, a front face opposite the rear face and a lateral face, the body further having at least one fastener opening extending between the front and rear faces, each fastener opening being adapted to receive a fastener for securing the body to the supporting wall; and an outer connecting member extending radially outwardly from the lateral face for securely engaging the inner connecting member of the connection collar to thereby attach the corresponding one of the first and second ends of the handrail to the supporting wall.

In one embodiment, the body includes: a flat base wall defining the rear and front faces of the body; and a sidewall extending away from the base wall, the sidewall being disposed away from the rear face so as to extend away from the supporting wall when the rear face is positioned against the supporting wall, the sidewall defining the lateral face.

In one embodiment, the handrail engagement member includes a rim surrounding the sidewall, the rim being spaced away from the base wall.

In one embodiment, the sidewall includes a first sidewall end located towards the base wall and a second sidewall end located away from the base wall, the rim being located at the second sidewall end.

In one embodiment, the sidewall has an S-shaped cross-section.

In one embodiment, the at least one fastener openings include a central fastener opening.

In one embodiment, the at least one fastener opening further includes a plurality of offcentered fastener openings disposed around the central fastener opening.

In one embodiment, each offcentered fastener opening has a first opening diameter and the central fastener opening has a second opening diameter larger than the first opening diameter.

In one embodiment, the plurality of offcentered fastener openings includes first, second, third and fourth offcentered fastener openings.

In one embodiment, the first offcentered fastener opening, the second offcentered fastener opening and the central fastener opening being disposed along a first axis.

In one embodiment, the third offcentered fastener opening, the fourth offcentered fastener opening and the central fastener opening being disposed along a second axis perpendicular to the first axis.

In one embodiment, the plurality of offcentered fastener openings includes first, second and third offcentered fastener openings.

In one embodiment, the first offcentered fastener opening and the central fastener opening are disposed along a first axis, the second offcentered fastener opening and the central fastener opening are disposed along a second axis and the third offcentered fastener opening and the central fastener opening are disposed along a third axis, the first, second and third axes being angled from each other at an angle of 120 degrees.

In one embodiment, the body is circular.

In one embodiment, the connection collar includes a collar sidewall having a first end configured to be disposed towards the handrail and a second end adapted to be disposed towards the device, the connection collar further including an end wall extending orthogonally to the collar sidewall at the first end of the collar sidewall and an inner lip extending radially inwardly from the collar sidewall near the second end of the collar sidewall, the end wall and the inner lip being spaced apart to receive the outer connecting member therebetween.

In one embodiment, the assembly further comprises a base plate configured to be received between the supporting wall and the wall attachment device, the base plate including a central portion and a lateral portion extending radially outwardly from the central portion, the central portion including at least one fastener opening, the central portion being configured for receiving the rear face of the wall attachment device such that each fastener opening is aligned with a corresponding fastener opening of the wall attachment device.

In one embodiment, the base plate includes a central recess extending from the front plate face towards the rear plate face, the central recess being sized and shaped to matingly receive the wall attachment device.

In one embodiment, the connection collar has a first diameter and the lateral portion of the base plate has a second diameter larger than the first diameter.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 7 is a partial top rear perspective view of a handrail and the wall attachment device illustrated in FIG. 1A, with the handrail connected to the wall attachment device via a 90-degree connecting piece;

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

Although the embodiments of the wall attachment device and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the wall attachment device, as will be briefly explained herein and as can be easily inferred herefrom by a person skilled in the art.

Figure 1A:
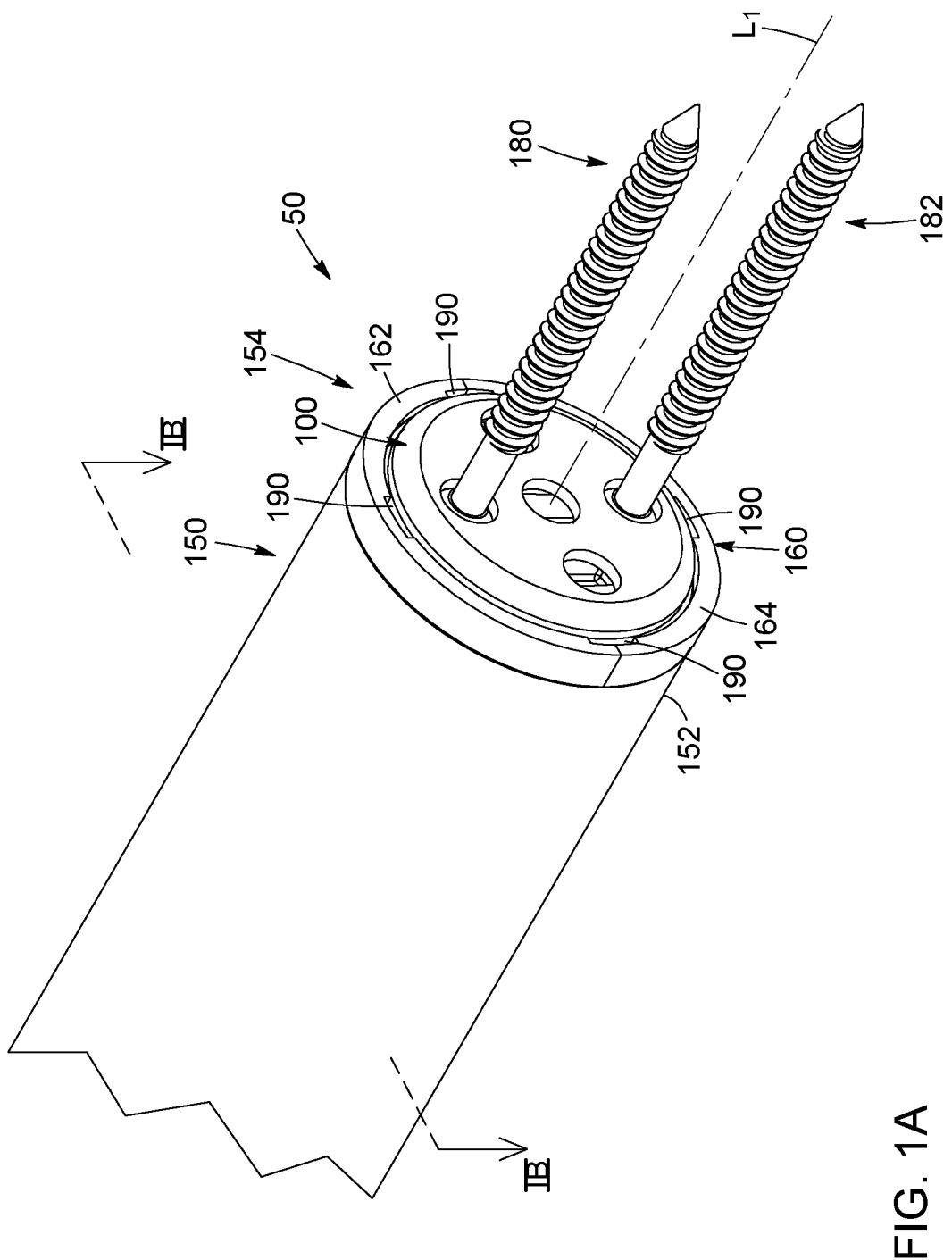
FIG. 1A is a partial top rear perspective view of a handrail and a wall attachment device connected to a first end of the handrail, in accordance with one embodiment.

Referring first to FIG. 1A, there is provided a handrail assembly 50 including a wall attachment device 100 and a handrail 150, in accordance with one embodiment. In the illustrated embodiment, the handrail 150 is elongated, straight and generally cylindrical, and includes a first end 152 and a second end, not shown. The device 100 is adapted to be secured to a supporting wall, not shown, and the first end 152 of the handrail 150 is adapted to be secured to the device 100 to thereby attach the first end 152 of the handrail 150 to the supporting wall.

Figure 1B:
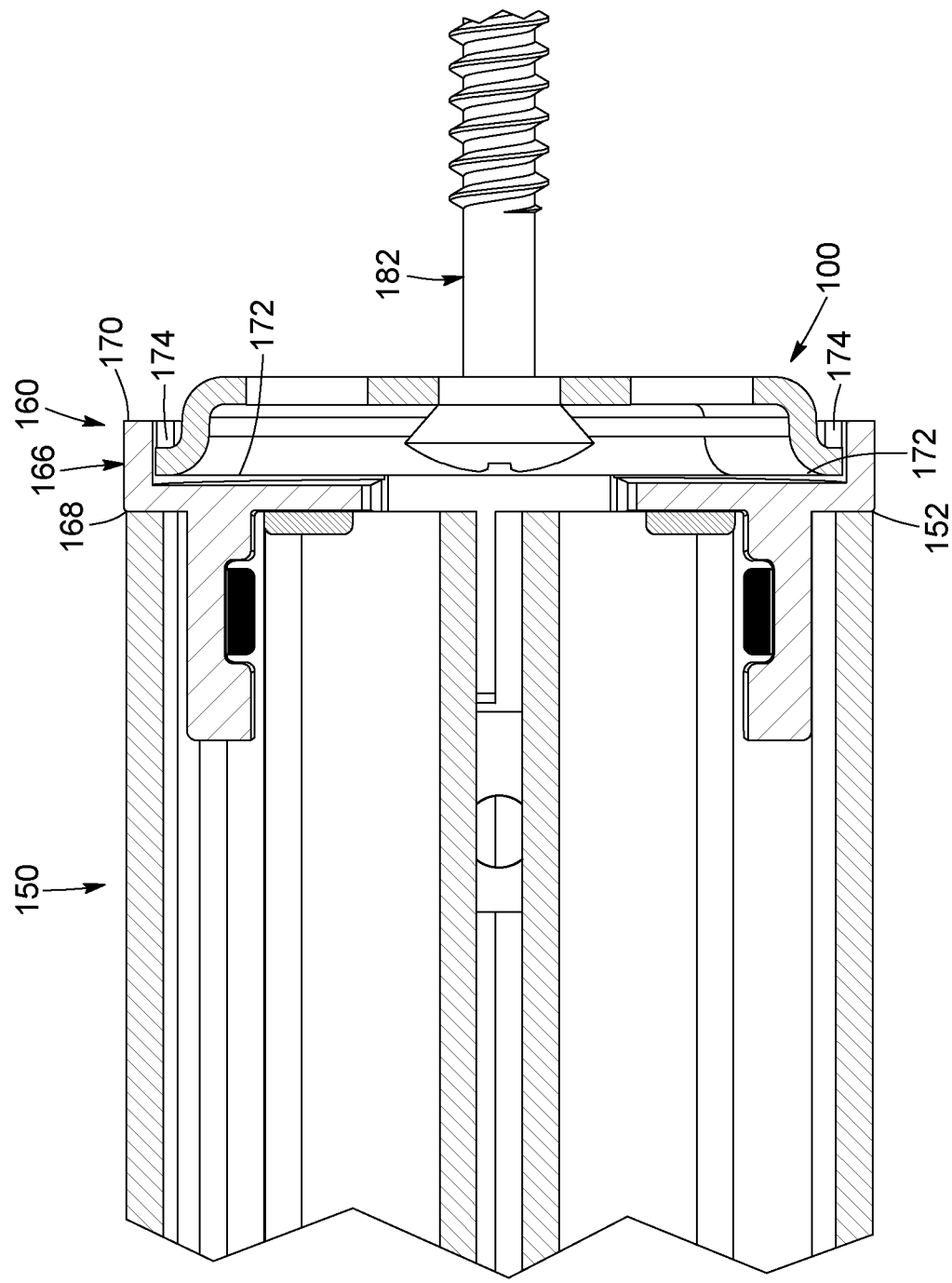
FIG. 1B is a longitudinal top cross-section view, taken along cross-section line IB-IB, of the handrail and of the wall attachment device connected to the first end of the handrail illustrated in FIG. 1A.
Figure 2:
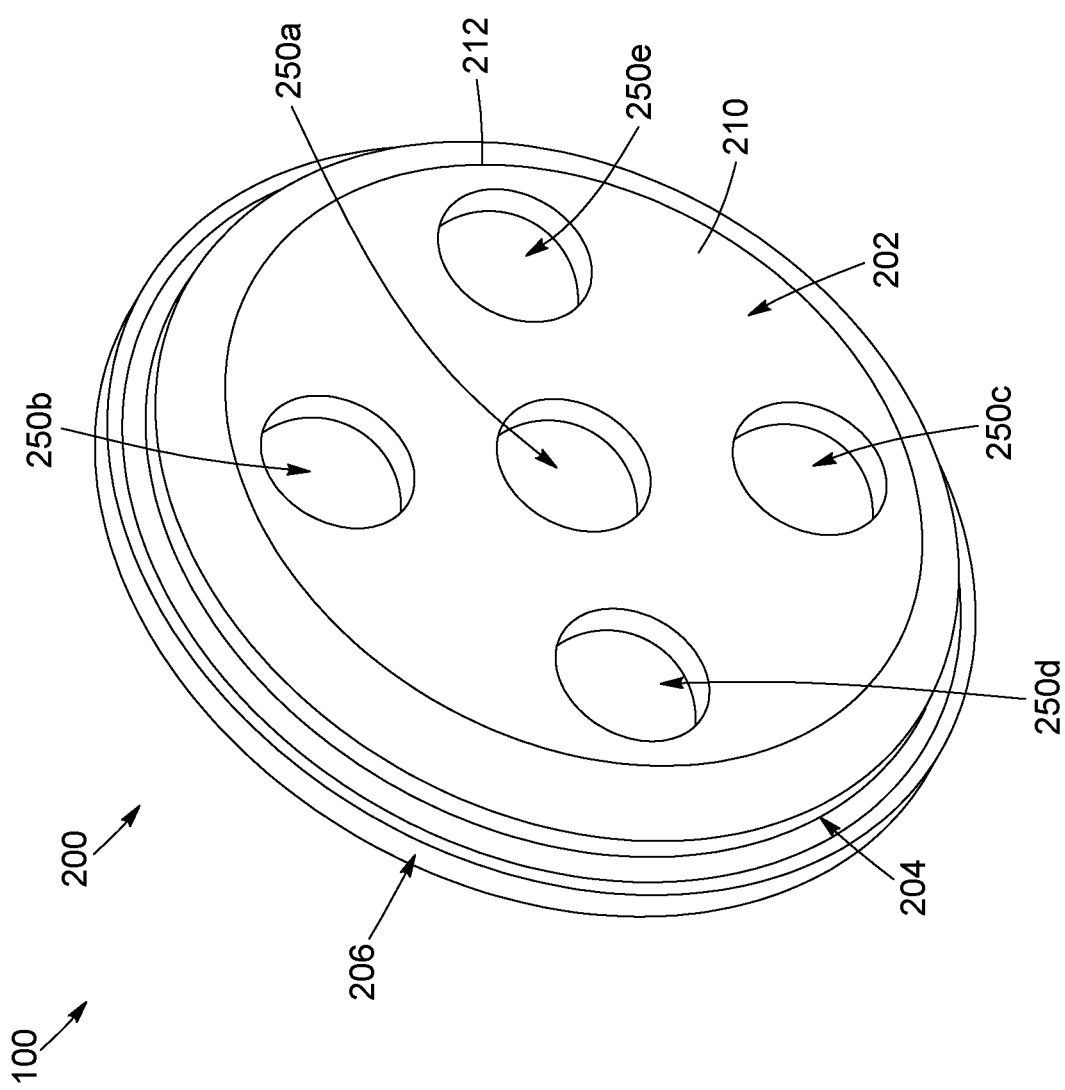
FIG. 2 is a top rear perspective view of the wall attachment device illustrated in FIG. 1A.
Figure 3:
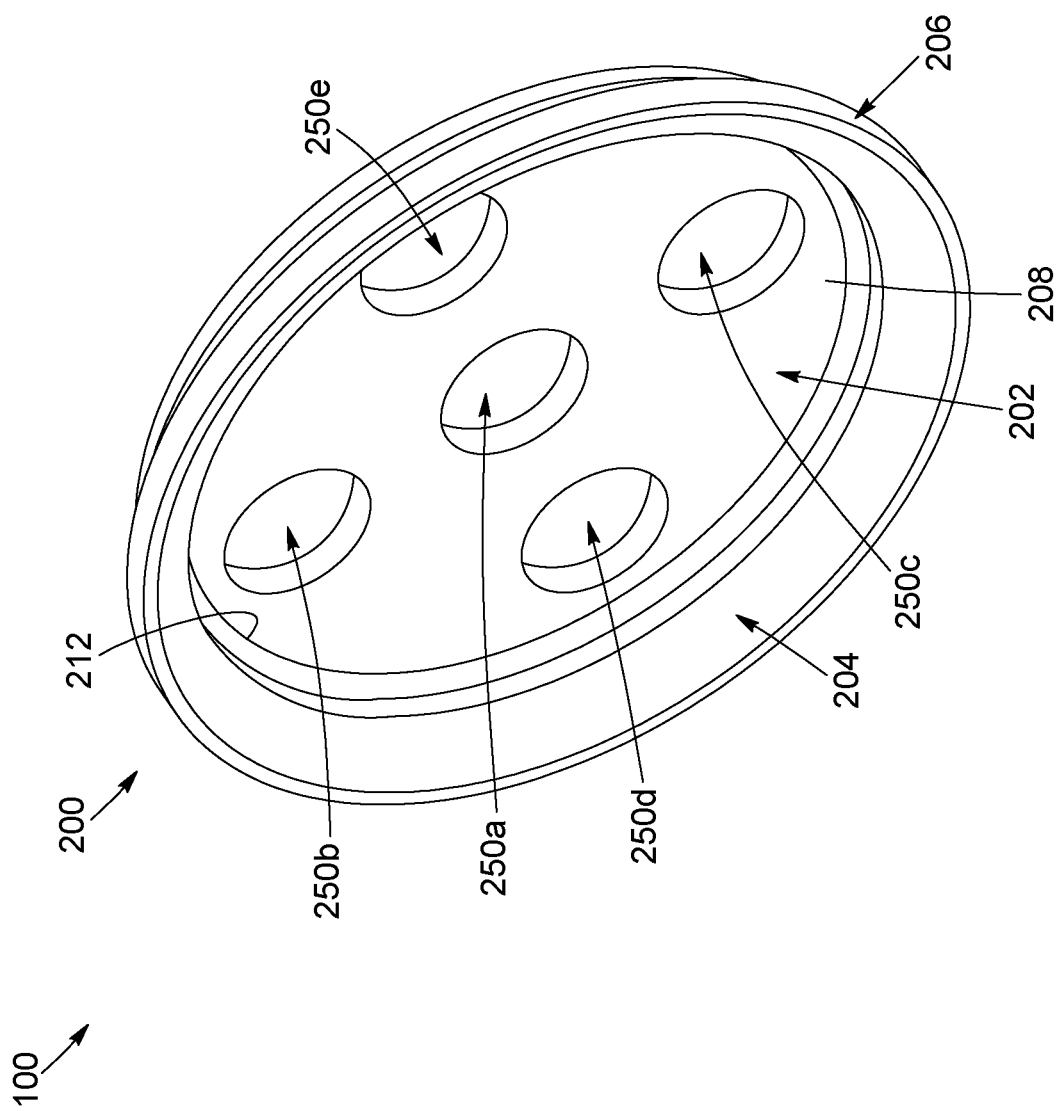
FIG. 3 is a top front perspective view of the wall attachment device illustrated in FIG. 1A.
Figure 4:
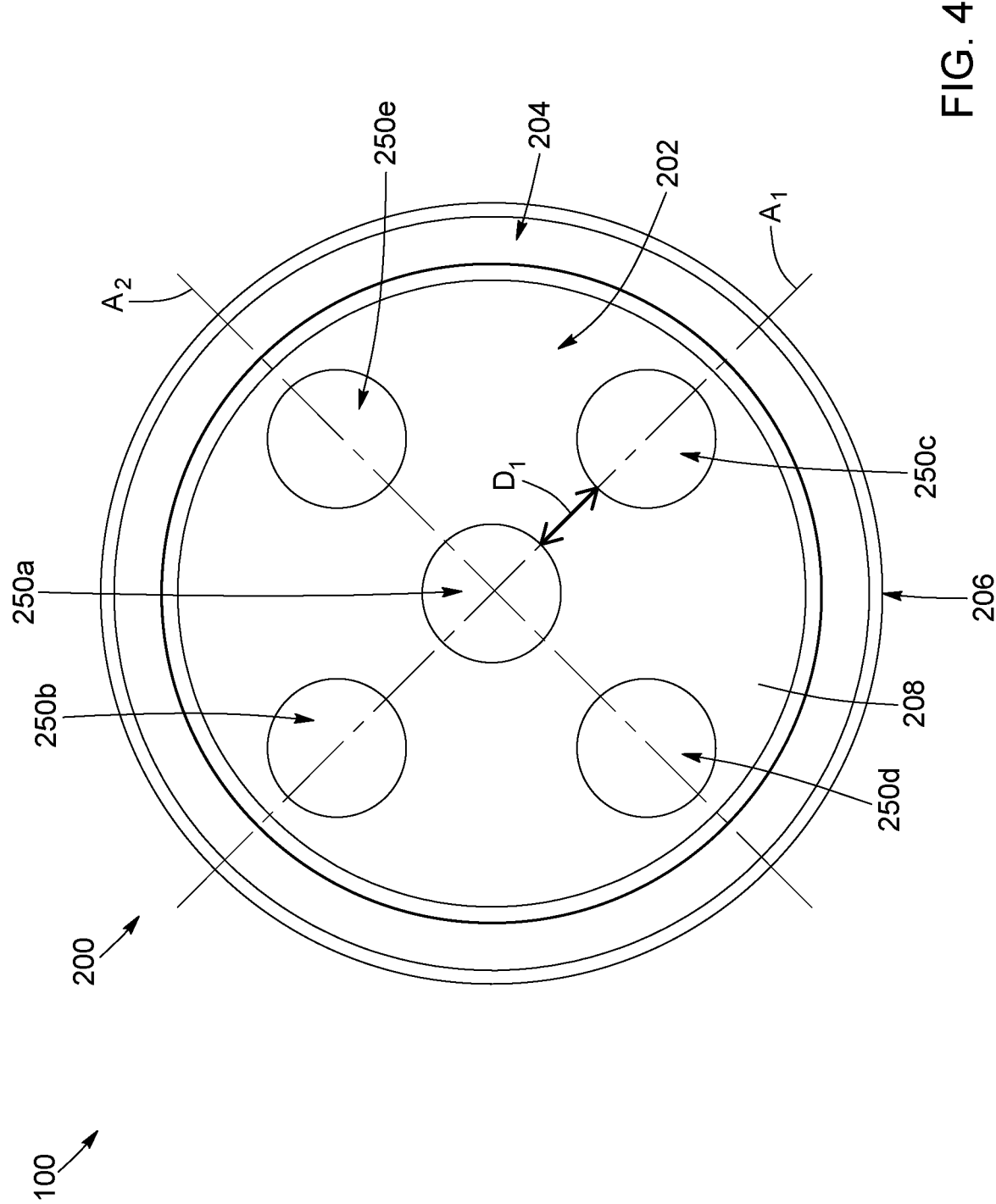
FIG. 4 is a front elevation view of the wall attachment device illustrated in FIG. 1A.

In the embodiment illustrated in FIGS. 1A and 1B, the handrail assembly 50 further includes a connection piece 154 which connects the device 100 to the handrail 150. More specifically, the connection piece 154 includes an annular connection collar 160 having a first half portion 162 and a corresponding second half portion 164 which engage the first end 152 of the handrail 150. The first and second half portions 162, 164 are adapted to be secured together to form the connection collar 160 which lockably engages the first end 152 of the handrail 150 and the device 100 to thereby secure the device 100 to the first end 152 of the handrail 150.

As best shown in FIG. 1B, the collar 160 is hollow and includes a sidewall 166 having a first end 168 disposed towards the handrail 150 and a second end 170 disposed towards the device 100. The collar 160 further includes an end wall 172 extending orthogonally to the sidewall 166 at the first end 168 of the sidewall 166 and an inner lip 174 extending radially inwardly from the sidewall 166 near the second end 170 of the sidewall 166. The end wall 172 and the inner lip 174 define an inner connecting member which is adapted to engage the wall attachment device 100. Specifically, the collar 160 is adapted to receive and hold the device 100 between the end wall 172 and the inner lip 174 to prevent movement of the handrail 150 relative to the device 100, and therefore to the supporting wall to which the device 100 is secured, as will be further explained below.

Figure 5:
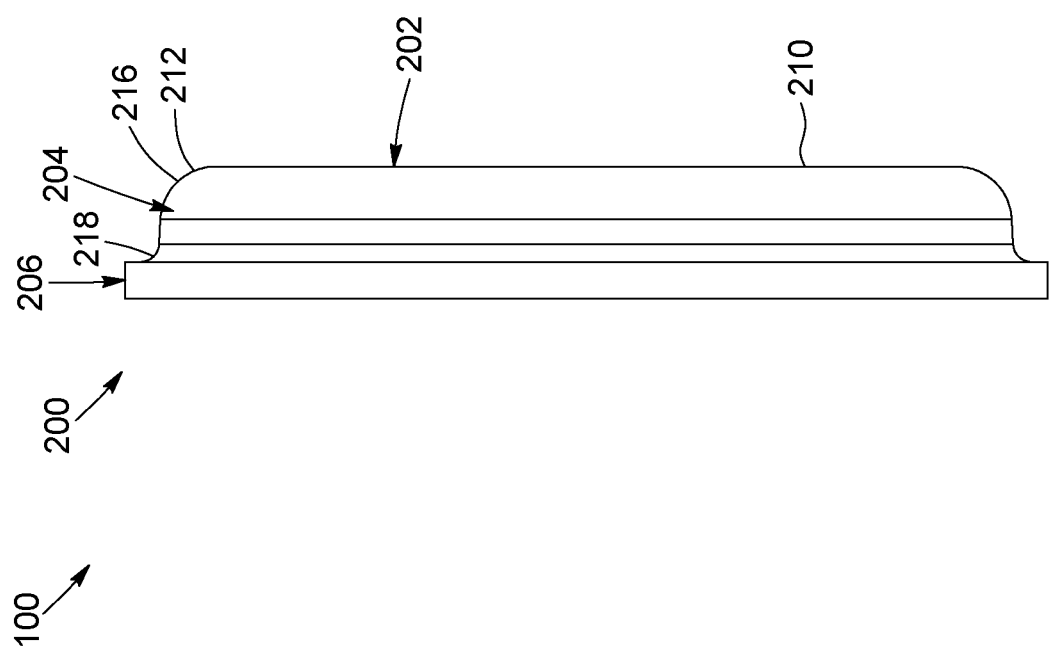
FIG. 5 is a left side elevation view of the wall attachment device illustrated in FIG. 1A.

Turning now to FIGS. 2 to 5, the device 100 has a generally saucer-shaped body 200 which includes a flat circular bottom portion or base wall 202, a sidewall 204 extending away from the base wall 202 and a circular rim 206 extending radially outwardly from the sidewall 204. More specifically, the sidewall 204 defines an annular lateral face 214 which faces outwardly and the rim 206 extends radially outwardly from the lateral face 214. In the illustrated embodiment, the sidewall 204 includes a first or rear sidewall end 216 located towards the base wall 202 and a second or front sidewall end 218 located away from the base wall 202, as best shown in FIG. 5, and the rim 206 is located at the front sidewall end 218. Alternatively, the rim 206 may be spaced from the second sidewall end 218 towards the first sidewall end 216, while still remaining spaced from the first sidewall end 216. In this embodiment, the sidewall 204 would therefore extend away from the base wall 202 beyond the rim 206.

Still referring to FIGS. 2 to 5, the base wall 202 defines a front face 208, an opposed rear face 210 and a circular outer edge 212. More specifically, the rear face 210 defines a planar surface which can be placed against a planar face of the supporting wall.

In the embodiment illustrated in FIGS. 2 to 5, the sidewall 204 is curved and has a generally S-shaped cross-section, as best shown in FIG. 5. More specifically, the sidewall 204 extends from the outer edge 212 of the base wall 202 and curves first convexly away from the front face 208 of the base wall 202, and then concavely towards the circular rim 206. Alternatively, the sidewall 204 may not be curved, but may instead be conical. Specifically, the sidewall 204 may have a straight cross-section which tapers outwardly from the base wall 202 to the circular rim 206, and which defines relatively sharp angles with the outer edge 212 of the base wall 202 and/or with the circular rim 206.

In the embodiment illustrated in FIGS. 2 to 5, the device 100 further includes a plurality of fastener openings or holes 250 defined in the base wall 202 and extending between the front face 208 and the rear face 210. Specifically, the device 100 includes five circular fastener holes 250a, 250b, 250c, 250d, 250e disposed in a cross-shaped pattern on the base wall 202. The plurality of fastener holes 250 includes a central fastener hole 250a which is generally centered on the base wall 202, first and second outer or offcentered fastener holes 250b, 250c disposed on opposite sides of the central hole 250a and third and fourth outer or offcentered fastener holes 250d, 250e which are also disposed on opposite sides of the central fastener hole 250a. The central fastener hole 250a, the first offcentered fastener hole 250b and the second offcentered fastener hole 250c are disposed along a first axis $A_1$ and the central fastener hole 250a, the third offcentered fastener hole 250d and the fourth offcentered fastener hole 250e are disposed along a second axis $A_2$ which is generally perpendicular to the first axis $A_1$.

Still in the embodiment illustrated in FIGS. 2 to 5, the first and the second offcentered fastener holes 250b, 250c are spaced from the central fastener hole 250a by the same distance $D_1$ and the third and fourth offcentered fastener holes 250d, 250e are also spaced from the central fastener hole 250a by the same distance $D_1$. Furthermore, the outer holes 250b, 250c, 250d, 250e are disposed closer to the outer edge 212 of the base wall 202 than to the central fastener hole 250a. Alternatively, the holes 250 could be disposed on the base wall 202 according to one of various other patterns. In yet another embodiment, the holes 250 could include only three holes, or any other number of holes which a skilled person would consider to be suitable for securing the device 100 to the wall.

Each hole 250 is sized and shaped to be able to receive one of various fasteners. For example, each hole 250 may have a diameter of about 7 mm to be able to receive fasteners such as #12 or #14 wood screws or sheet metal screws, 10-24, 12-24, or ¼"-20 machine screws or any other type of fastener which a skilled person would consider to be suitable for securing the device 100 to the wall. Alternatively, each hole 250 may be sized and shaped to receive a specific type of fasteners. In another embodiment, the holes 250 may be threaded to be threadably engaged by a threaded fastener.

Referring to FIGS. 1B and 2 to 5, the body 200 is further sized and shaped to be received in the connection piece 154 and the rim 206 defines an outer connecting member which engages the inner connecting member of the collar 160. Specifically, the circular rim 206 is sized and shaped to abut the inner lip 174 of the collar 160. More specifically, the rim 206 has an outer diameter which is larger that an inner diameter of the inner lip 174. In one embodiment, the circular rim 206 further has a thickness which corresponds to the distance between the end wall 172 and the inner lip 174 such that the circular rim 206 is received snuggly between the end wall 172 and the inner lip 174 in order to prevent axial movement of the handrail 150 both towards the wall and away from the wall. Alternatively, the thickness of the circular rim 206 may be slightly smaller than the distance between the end wall 172 and the inner lip 174 to provide some free play to allow adjustment of the handrail's position and/or orientation during the mounting of the handrail to the device.

To attach the end of the handrail 150 to the supporting wall, the device 100 is first secured to the supporting wall using at least one fastener such that the rear face 210 of the base wall 202 abuts the wall and is parallel to the planar surface of the supporting wall. In the embodiment illustrated in FIGS. 1A and 1B, the device 100 is secured to the wall using a first fastener 180 inserted in the first offcentered fastener hole 250*b* and a second fastener 182 inserted in the second offcentered fastener hole 250*c*. It will be appreciated that in this configuration, the device 100 is secured to the wall using two fasteners 180, 182 on opposite sides of the central fastener hole 250*a*, which helps position the device 100 on the wall such that the entire rear face 210 of the base wall 202 abut the wall. Alternatively, the first and second fasteners 180, 182 could instead be received in the third and fourth offcentered fastener holes 250*d*, 250*e*. In yet another embodiment, the device 100 could instead be secured to the wall using a single fastener inserted in one of the holes 250, or using more than two fasteners inserted in corresponding holes of the device 100.

In one embodiment, the holes 250 are slightly larger than the first and second fasteners 180, 182 to allow for adjustment of the device's position on the wall once one or both of the fasteners 180, 182 have been inserted in their corresponding holes 250. In yet another embodiment, the holes 250 may be elongated instead of being circular to allow for further adjustment of the device's position.

In one embodiment, the collar 160 may then be positioned in engagement with the device 100. Specifically, the first and second half portions 162, 164 of the collar 160 are positioned generally in the same plane as the device 100, laterally to the device 100, and are then moved towards each other until they meet, with the circular rim 206 of the device 100 being longitudinally disposed between the end wall 172 and the inner lip 174. The first and second half portions 162, 164 may then be secured to each other using fasteners, clips or any other appropriate fastening technique to form the collar 160 and to thereby enclose the circular rim 206 within the collar 160 between the end wall 172 and the inner lip 174 of the collar 160.

Still in this embodiment, the first end 152 of the handrail 150 may then engage the collar 160 and be secured to the collar 160 using fasteners or any other appropriate securing technique. In this configuration, the first end 152 of the handrail 150 may be adapted to further hold the first and second half portions 162, 164 together. Once secured to the collar 160, the handrail 150 is positioned such that the base wall 202 of the device 100 is orthogonal to a longitudinal axis $L_1$ of the handrail 150, and therefore such that the longitudinal axis $L_1$ of the handrail 150 is orthogonal to the wall.

In an alternative embodiment, the handrail 150 may first be positioned relative to the device 100 such that the first end 152 of the handrail 150 is located adjacent the device 100, and the first and second half portions 162, 164 of the collar 160 may be secured together simultaneously over both the device 100 and the first end 152 of the handrail 150 to thereby attach the handrail 150 to the device 100.

It will be understood that in addition to the device 100, the handrail 150 may also be mounted to the supporting wall and supported on the wall by mounting brackets which may be disposed along the length of the handrail.

It will be appreciated that the device 100 described herein allows the first end 152 of the handrail 150 to be attached to the supporting wall without requiring the use of a flange extending radially outwardly from the first end 152 of the handrail 150. Furthermore, the wall attachment device 100 may be completely hidden from view when the handrail 150 is mounted to the supporting wall, thereby providing the handrail 150 which a relatively aesthetically pleasing appearance.

It will further be understood that instead of a rim surrounding the sidewall 204, the outer connecting member could instead include one or more tabs extending outwardly from the sidewall and spaced from each other. Alternatively, the outer connecting member could be configured according to any other configuration which a skilled person would consider to be suitable.

Figure 6A:
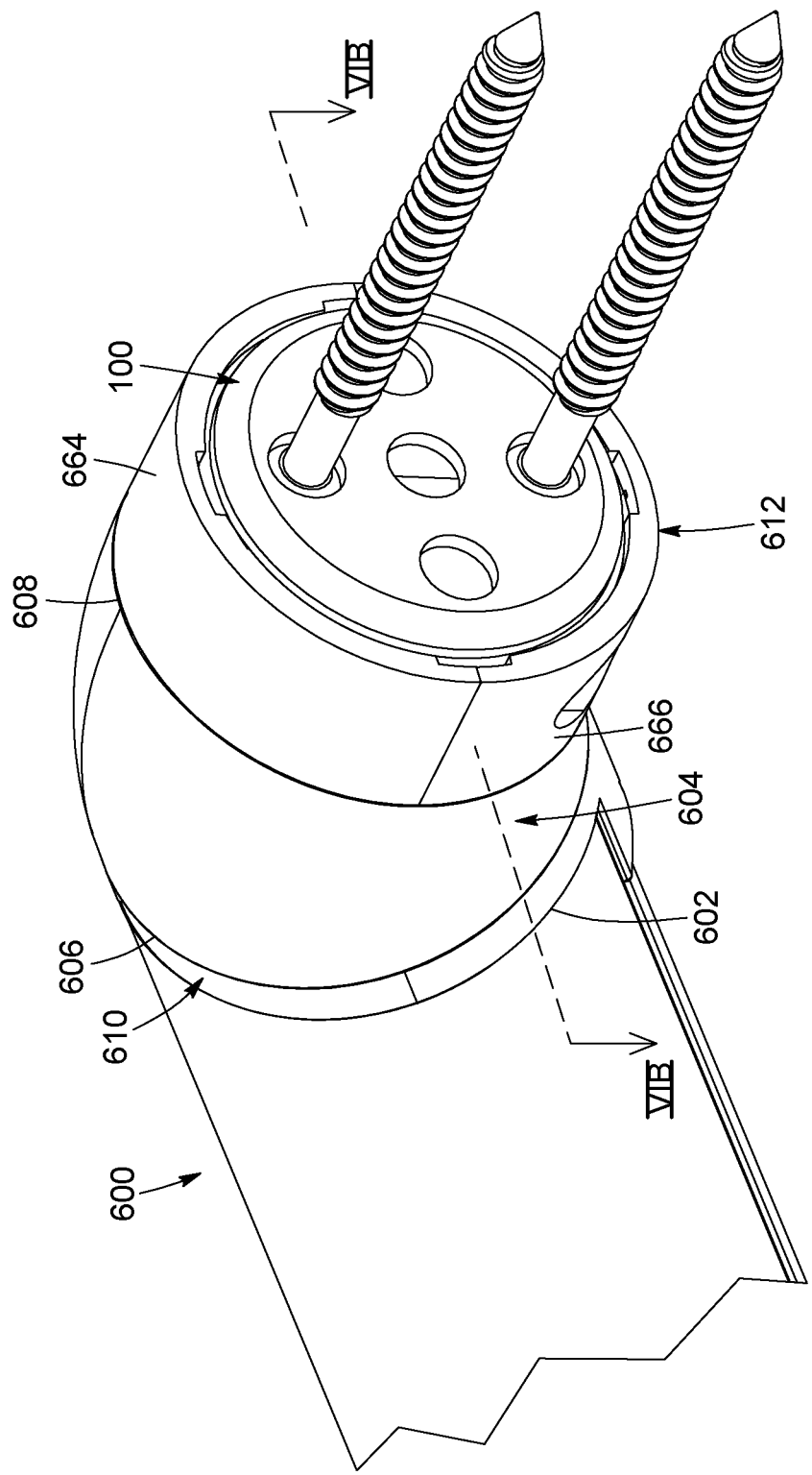
FIG. 6A is a partial top rear perspective view of a handrail and the wall attachment device illustrated in FIG. 1A, with the handrail connected to the wall attachment device via an angled connecting piece.
Figure 6B:
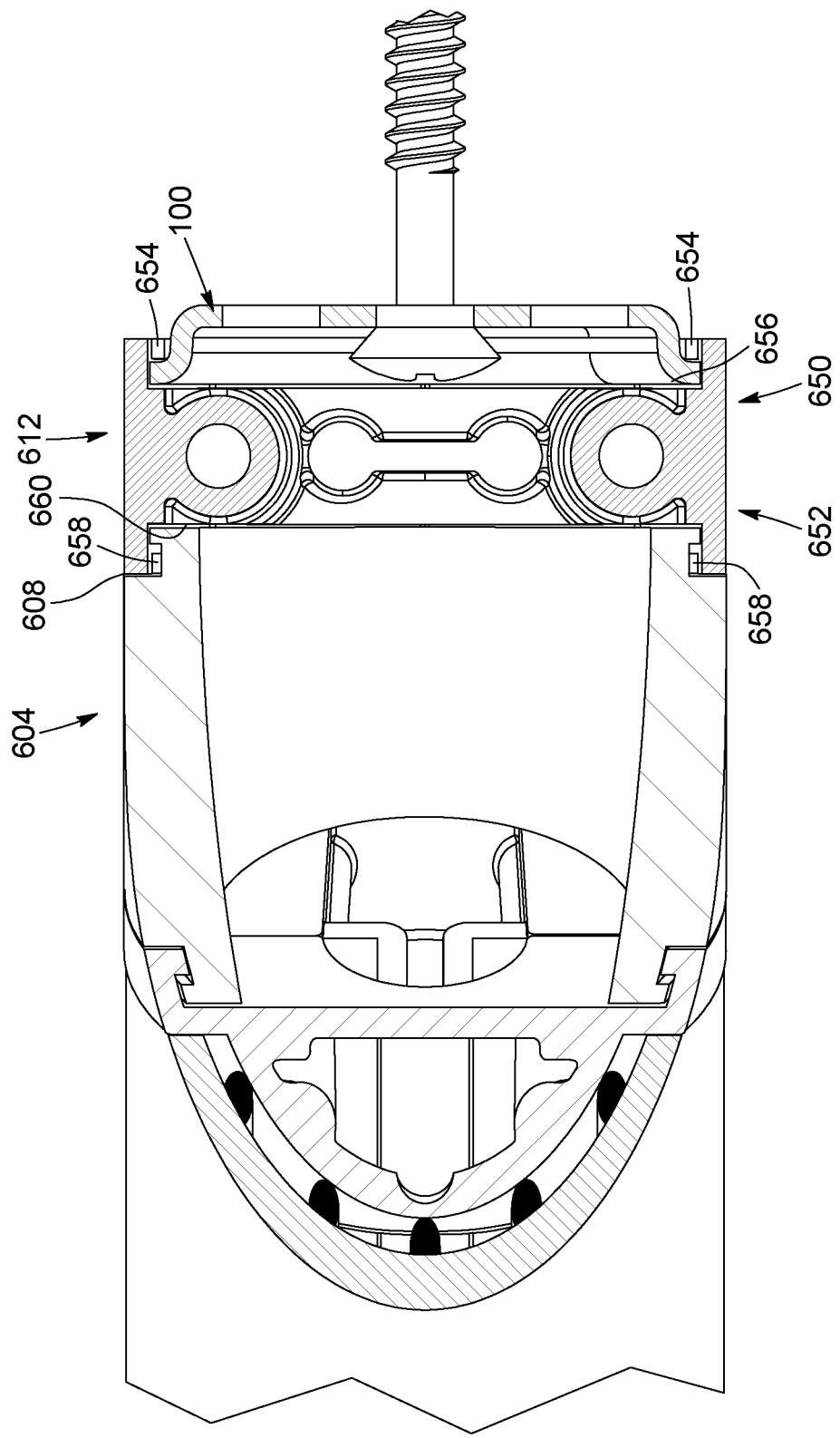
FIG. 6B is a longitudinal top cross-section view, taken along cross-section line VIB-VIB, of the handrail and of the wall attachment device connected to the first end of the handrail illustrated in FIG. 6A.

Turning now to FIGS. 6A and 6B, the wall attachment device 100 is shown connected to a handrail 600, in accordance with another embodiment. Similarly to the handrail 150 described above, the handrail 600 is elongated and generally cylindrical, and includes a first end 602 and a second end, not shown.

In the embodiment illustrated in FIGS. 6A and 6B, the first end 602 of the handrail 600 is connected to the device 100 via an angled connection piece 604 such that the longitudinal axis $L_1$ of the handrail 600 is angled to the wall rather than orthogonal to the wall. Specifically, the angled connection piece 604 includes a first end 606 and an opposed second end 608. The first end 606 is adapted to be secured to the first end 602 of the handrail 600 by a first circular connection collar 610 similar to the circular connection collar 160 described above, and the second end 608 is adapted to be secured to the device 100 by a second circular connection collar 612.

Still in the embodiment illustrated in FIGS. 6A and 6B, the second circular connection collar 612 includes a first end portion 650 disposed towards the device 100 and adapted to securely engage the device 100, and a second end portion 652 disposed towards the angled connection piece 604 and adapted to securely engage the second end 608 of the angled connection piece 604.

As shown in FIG. 6B, the first and second end portions 650, 652 are mirror images of each other. The first end portion 650 is generally similar to the circular connection collar 160 described above and includes a first inner lip 654 and a first inner end wall 656 spaced from the first inner lip 654 to receive the circular rim 206 of the device 100 between the first inner lip 654 and the first inner end wall 656. In the illustrated embodiment, the second end portion 652 also includes a second inner lip 658 and a second inner end wall 660 which are adapted to receive an outwardly-extending rim 662 located at the second end 608 of the angled connection piece 604.

To mount the handrail 600 to the wall, the device 100 is first mounted to the wall using fasteners, as described above. The first end 602 of the handrail 600 is then secured to the angled connection piece 604 using the first circular connection collar 610. The angled connection piece 604 may then be positioned such that the first end portion 650 of the angled connection piece 604 is adjacent the device 100.

In the embodiment illustrated in FIGS. 6A and 6B, the second circular connection collar 612 includes first and second half portions 664, 666 which are adapted to come together to form the second circular connection collar 612, similarly to the collar 160 described above.

To secure the angled connection piece 604 to the device 100, the first and second half portions 664, 666 of the second circular connection collar 612 are moved towards each other until they meet, with the circular rim 206 of the device 100 being longitudinally disposed between the first inner lip 654 and the first inner end wall 656 and the outwardly-extending rim 662 of the angled connection piece 604 being longitudinally disposed between the second inner lip 658 and the second inner end wall 660. The first and second half portions 664, 666 may then be secured to each other using fasteners or any other appropriate fastening technique to form the second circular connection collar 612.

Alternatively, the angled connection piece 604 may first be secured to the device 100 using the second circular connection collar 612, and then be secured to the handrail 600 using the first circular connection collar 610.

Referring now to FIG. 7, the wall attachment device 100 is shown attached to a handrail 700 via a 90-degree connection piece 702. In this embodiment, the 90-degree connection piece 702 is generally similar to the angled connection piece 604 and includes a first end 704 adapted to be connected to the device 100 via a circular connection collar 706 similar to the second circular connection collar 612 described above and a second end 708 angled at an angle of 90 degrees relative to the first end 704 and adapted to be connected to the handrail 700. This configuration allows the handrail 700 to extend generally parallel to the wall when mounted to the wall.

Figure 8:
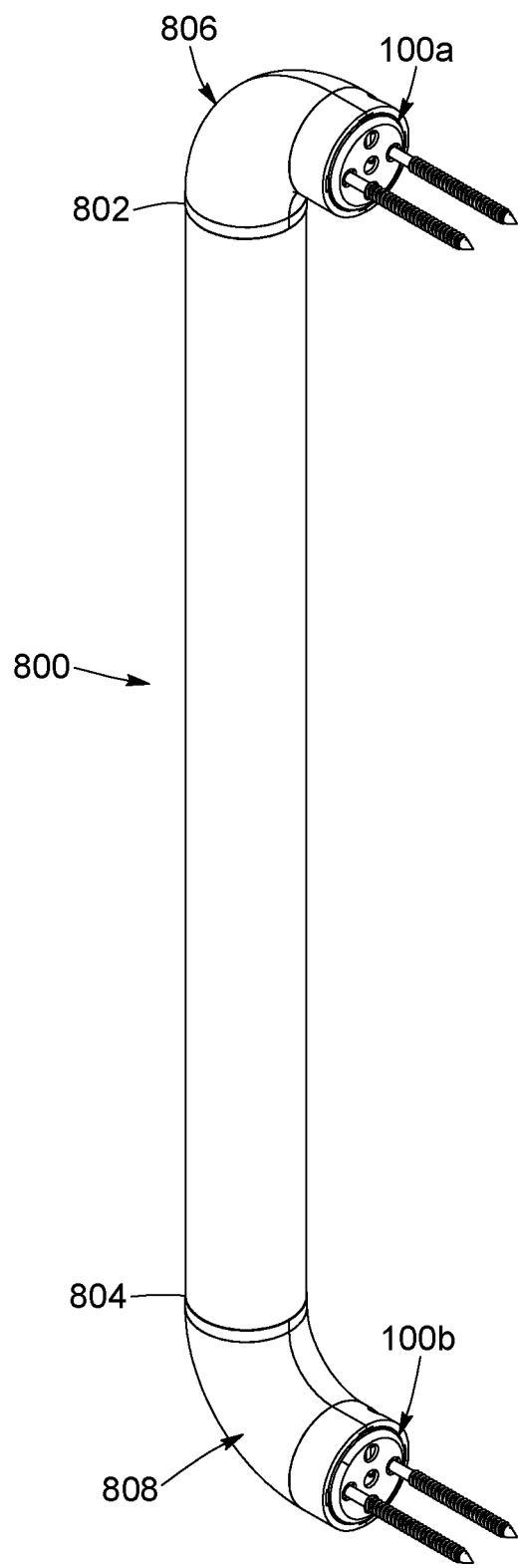
FIG. 8 is a perspective view of a handrail and two wall attachment devices illustrated in FIG. 1A, with the handrail connected to both wall attachment devices via two 90-degree connecting pieces secured to both ends of the handrail to form a grab bar configuration.
Figure 9:
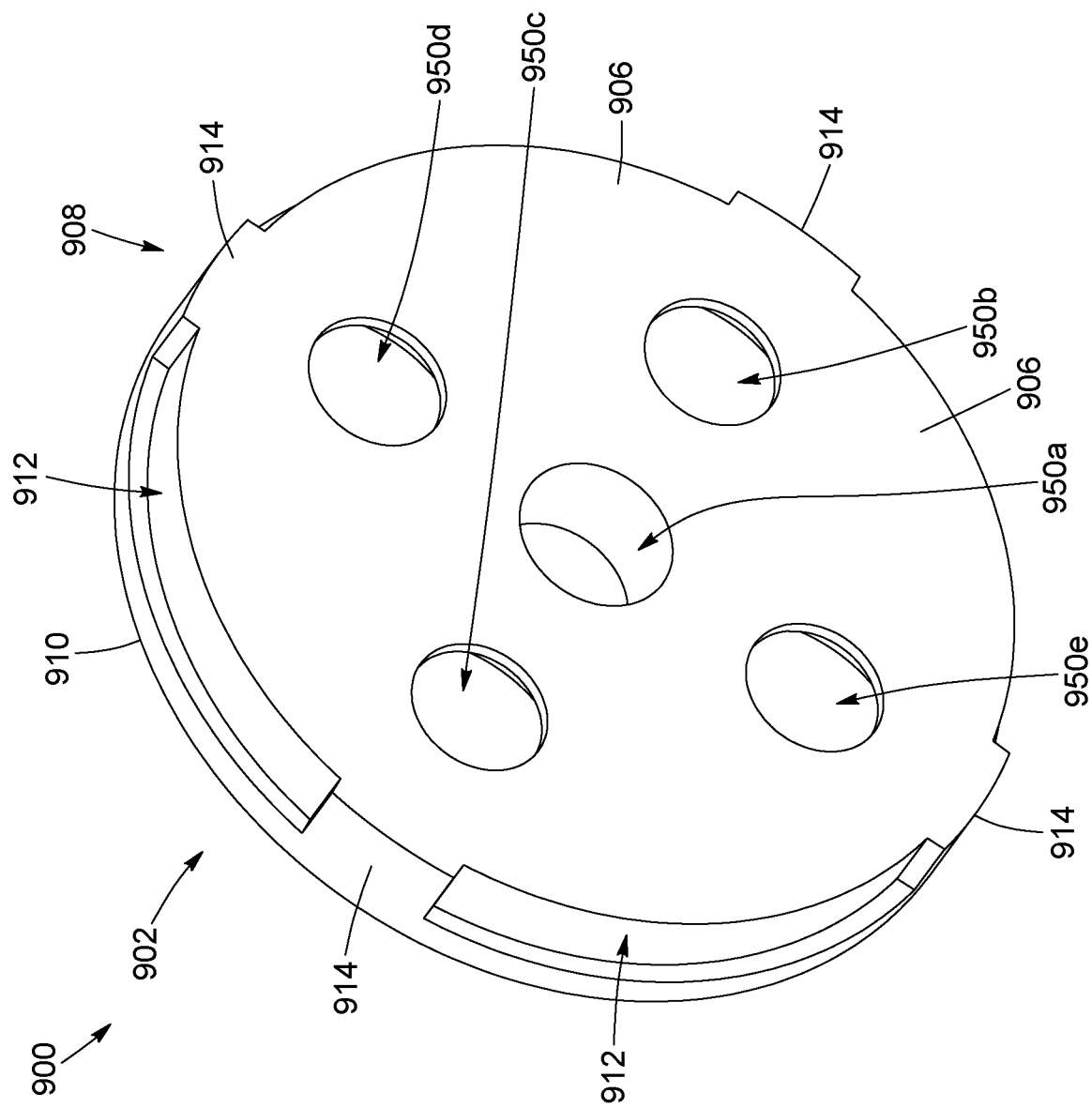
FIG. 9 is a top rear perspective view of a wall attachment device, in accordance with another embodiment.
Figure 10:
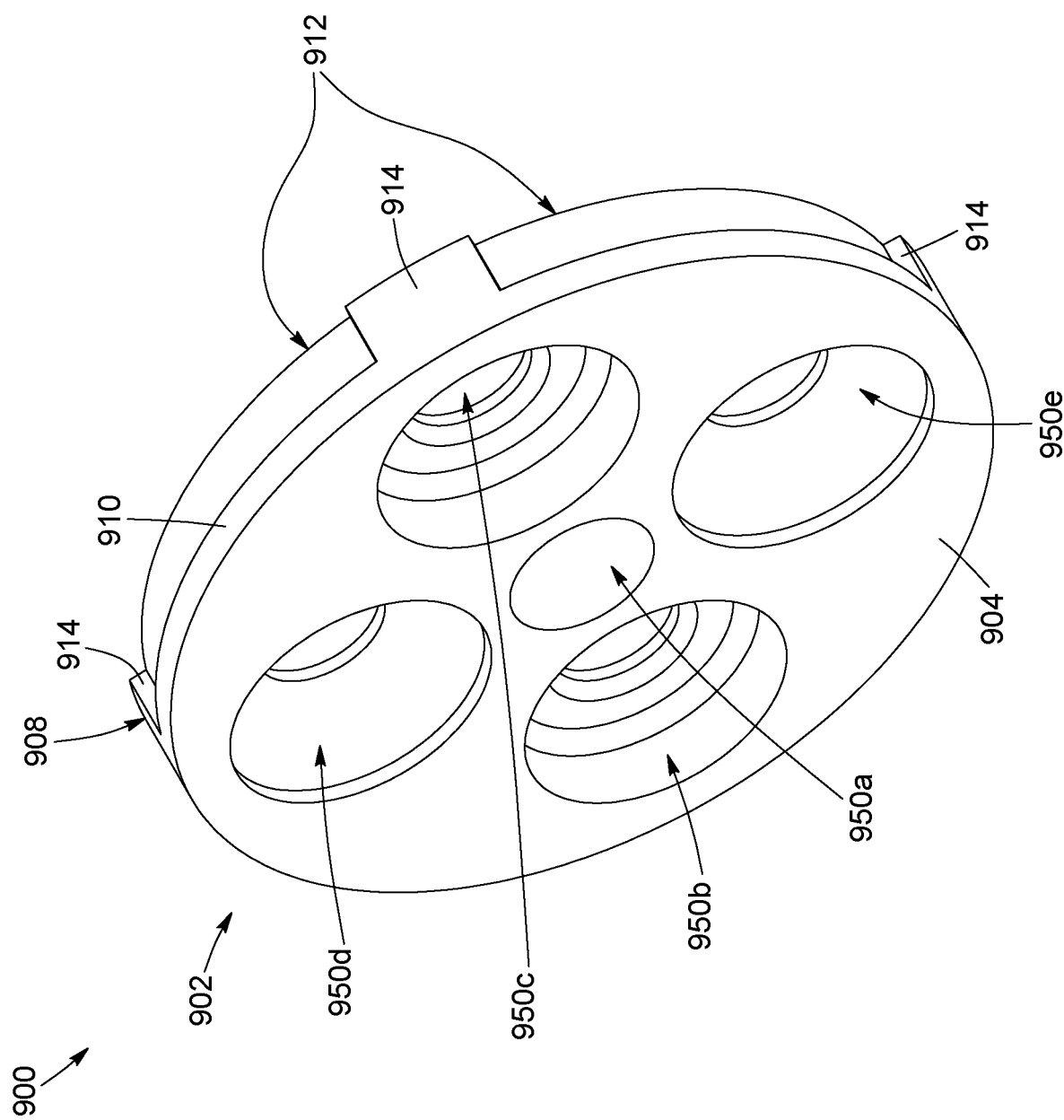
FIG. 10 is a top front perspective view of the wall attachment device illustrated in FIG. 9.
Figure 11:
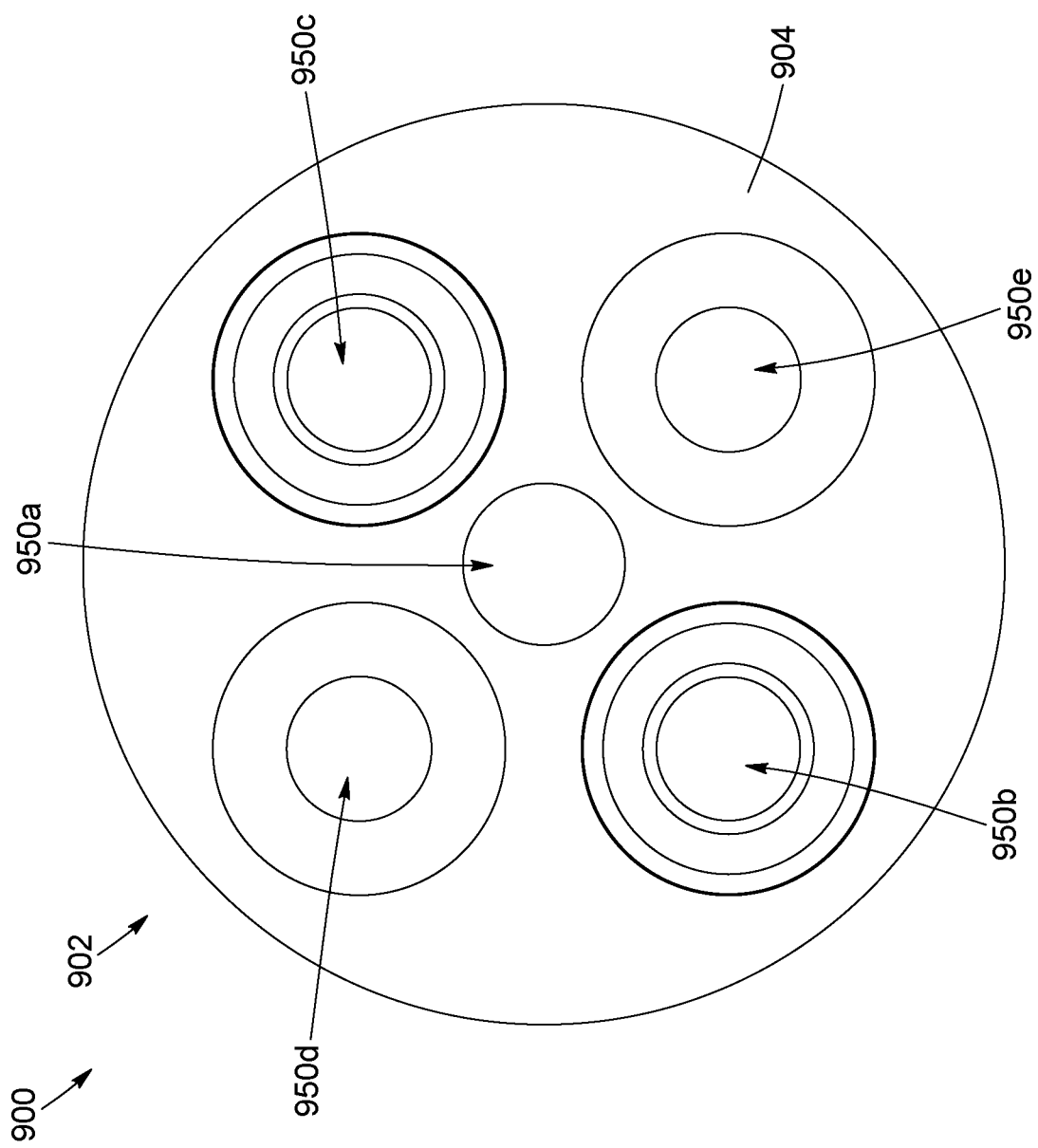
FIG. 11 is a front elevation view of the wall attachment device illustrated in FIG. 9.
Figure 12:
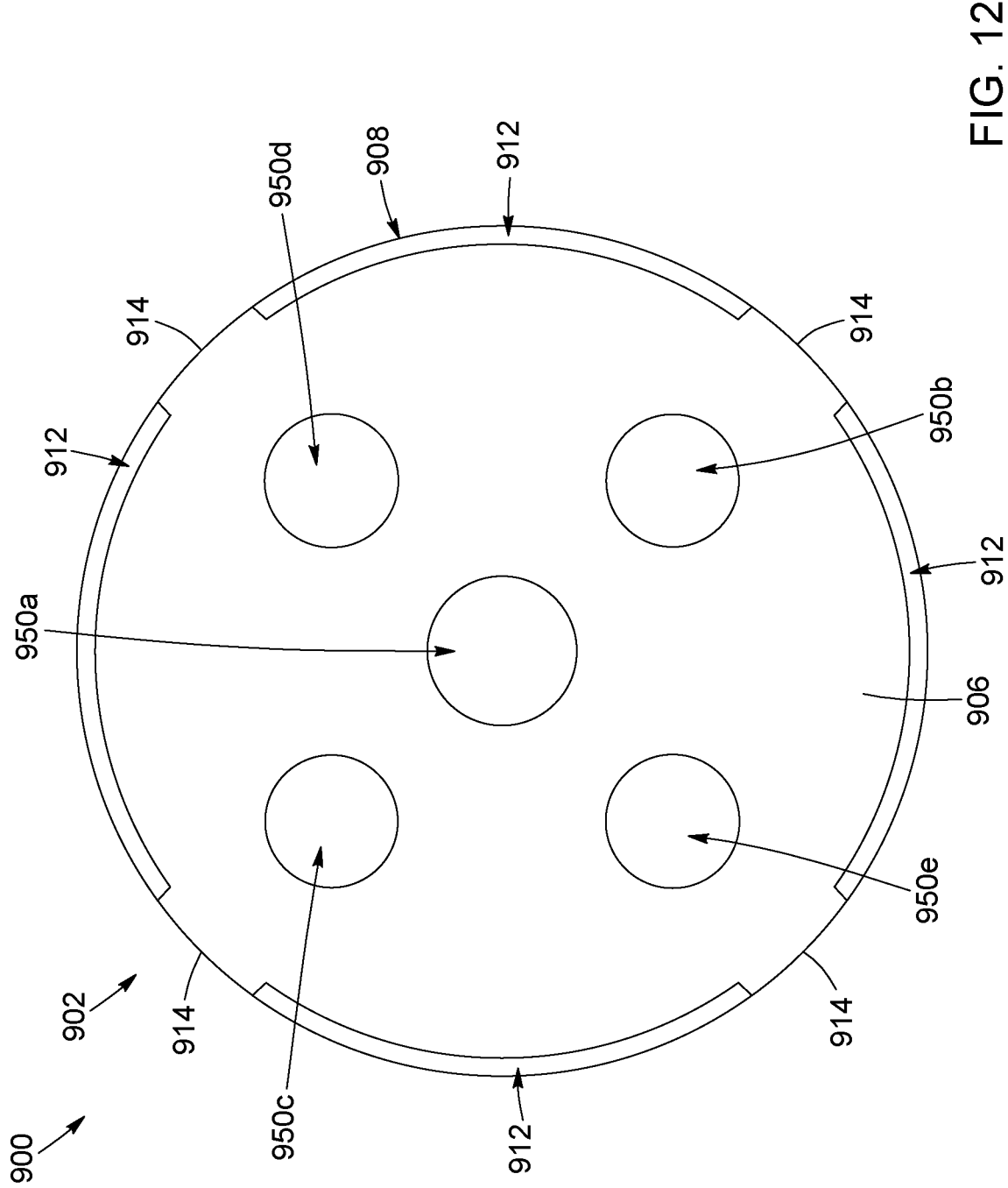
FIG. 12 is a rear elevation view of the wall attachment device illustrated in FIG. 9.
Figure 13:
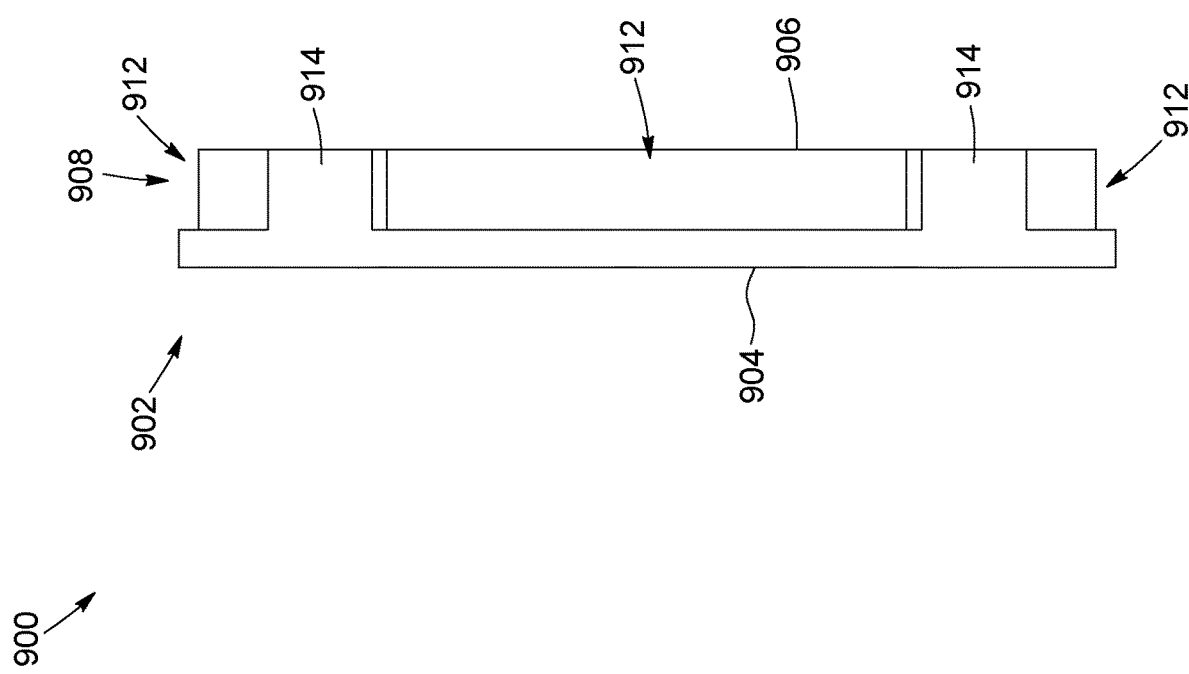
FIG. 13 is a left side elevation view of the wall attachment device illustrated in FIG. 9.

Now turning to FIG. 8, there is shown a handrail 800 mounted to the wall in a grab bar configuration using a first wall mounting device 100a and a second wall mounting device 100b which are both similar to the wall mounting device 100 described above. Specifically, the handrail 800 is generally straight and elongated, and includes a first end 802 and a second end 804. The first end 802 is secured to the first wall mounting device 100a via a first 90-degree connection piece 806 similar to the 90-degree connection piece 702 described above with reference to FIG. 7, and the second end 804 is secured to the second wall mounting device 100b via a second 90-degree connection piece 808 which is also similar to the 90-degree connection piece 702.

The first and second 90-degree connection pieces 806, 808 are oriented such that the first and second wall mounting devices 100a, 100b are generally parallel to each other, which allows the first and second wall mounting devices 100a, 100b to be secured to the same wall using fasteners as described above.

It will be appreciated that the configuration described allows the handrail 800 to be properly secured in a grab bar configuration to corresponding wall studs in the wall to thereby provide a secure attachment of the handrail 800 to the wall. In the configuration described above, the devices 100a, 100b may first be precisely positioned on the wall studs and secured on the wall studs. The handrail 800 may then be cut to the appropriate length and fitted with the appropriate 90-degree connection pieces and/or other connectors to engage and be secured with the devices 100a, 100b.

Referring now to FIGS. 9 to 13, there is shown a wall attachment device 900 for a handrail, not shown, in accordance with another embodiment. In this embodiment, the device 900 includes a generally circular body 902 having a front face 904 and a rear face 906 adapted to be placed against a supporting wall. The body 902 further has a sidewall 908 which includes a continuous rim 910 located towards the front face 904 and which extends radially outwardly from the body 902, and a plurality of recesses 912 which are located towards the rear face 906 and are spaced apart around the body 902 to define a plurality of keys 914 between the recesses 912.

Similarly to the device 100, the wall attachment device 900 includes a plurality of a plurality of fastener holes 950 defined in the device's body 902 and extending between the front face 904 and the rear face 906. Specifically, the device 900 includes five circular fastener holes 950a, 950b, 950c, 950d, 950e disposed in a cross-shaped pattern on the body 902. The plurality of fastener holes 950 includes a central fastener hole 950a which is generally centered on the body 902, first and second outer or offcentered fastener holes 950b, 950c disposed on opposite sides of the central fastener hole 950a and third and fourth outer offcentered fastener holes 950d, 950e which are also disposed on opposite sides of the central fastener hole 950a.

In the embodiment illustrated in FIGS. 9 to 13, the first and second offcentered fastener holes 950b, 950c are counterbored on the front face 904 for receiving fasteners such as socket head cap screws, pan head screws, round head screws or the like such that the fastener heads do not protrude above the front face 904 of the body 902.

Still in the embodiment illustrated in FIGS. 9 to 13, the third and fourth offcentered fastener holes 950d, 950e are countersunk on the front face 904 for receiving conical head fasteners such as countersunk screws such that the fastener heads do not protrude above the front face 904 of the body 902.

Alternatively, all of the offcentered fastener holes 950b, 950c, 950d, 950e could be counterbored or countersunk, or none of the offcentered fastener holes 950b, 950c, 950d, 950e could be counterbored or countersunk.

To mount a handrail to a wall, the device 900 is first positioned against the wall such that the rear face 906 abuts the wall. One or more fasteners are then inserted through corresponding holes 950 of the device 900 to thereby secure the device 900 to the wall.

Depending on the type of handrail used, the handrail can then be connected to the device 900 via a collar such as the circular connection collar 160 illustrated in FIGS. 1A and 1B, or the second circular connection collar 612 illustrated in FIGS. 6A and 6B.

Referring particularly to FIGS. 1A and 1B, the collar 160 may include a plurality of keyways 190 defined in the inner lip 174. The keyways 190 are sized and shaped to receive the keys 914 of the device 900. The keyways 190 are further spaced from each other around the inner lip 174 such that the keyways 190 may be aligned with the keys 914.

To secure the handrail to the device 900, the first and second half portions 162, 164 of the collar 160 are positioned generally in the same plane as the device 900, laterally to the device 100, and are then moved towards each other until they meet, with the rim 910 of the device 100 being longitudinally disposed between the end wall 172 and the inner lip 174 and with the keys 914 being received in the keyways 190. The first and second half portions 162, 164 may then be secured to each other using fasteners or any other appropriate fastening technique to form the collar 160 and to thereby enclose the rim 910 within the collar 160 between the end wall 172 and the inner lip 174 of the collar 160. It will be appreciated that the keys 914 received in the keyways 190 prevent rotation of the collar relative to the device 900.

Alternatively, the handrail may be secured to the device 900 using a collar similar to the second circular connection collar 612 instead of the collar 160. In another embodiment, the handrail may be connected to the device 900 using a collar which does not include any keyways. In yet another embodiment, the handrail may be connected to the device 100 or 900 using a collar similar to the collar 612 but which has one or more small protruding teeth on the inside surface of first and second end portions 650, 652 that bite into the device 100 or 900 when the first and second half portions 664, 666 of the collar 612 are screwed together to thereby prevent rotation of the handrail relative to the device 100 or 900.

Figure 14:
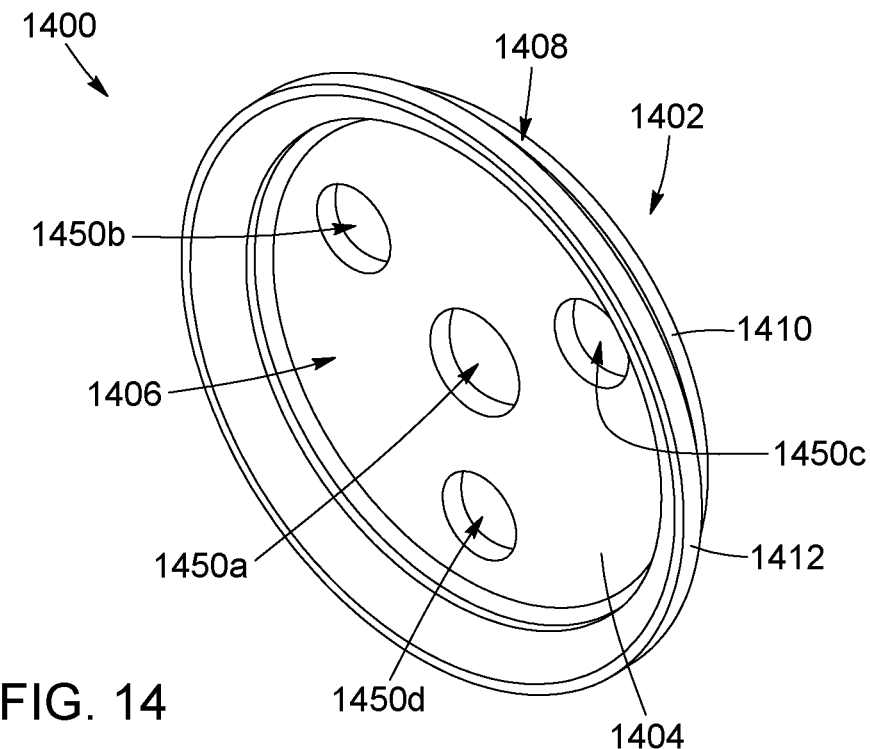
FIG. 14 is a top front perspective view of a wall attachment device, in accordance with another embodiment.
Figure 15:
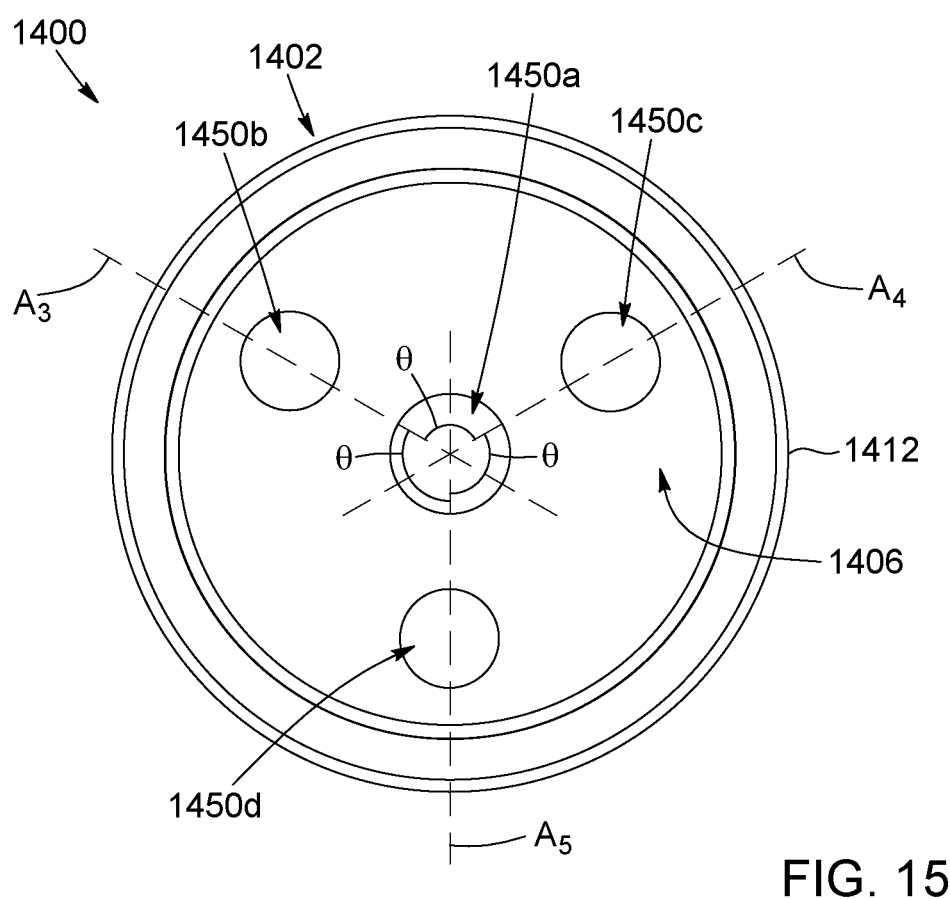
FIG. 15 is a front elevation view of the wall attachment device illustrated in FIG. 14.

Turning now to FIGS. 14 and 15, there is shown a wall attachment device 1400 for a handrail, not shown in FIGS. 14 and 15, in accordance with yet another embodiment.

In this embodiment, the wall attachment device 1400 is generally similar to the wall attachment device 100 described above and illustrated in FIGS. 1A to 8, and includes a body 1402 having a planar rear face, not shown adapted to be positioned against a supporting wall and a front face 1404 opposite the rear face. More specifically, the body 1402 includes a circular base wall 1406, a sidewall 1408 extending away from the base wall 1406 and defining a lateral face 1410 of the body 1402 and a rim 1412 extending radially outwardly from the sidewall 1408.

In the embodiment illustrated in FIGS. 14 and 15, the device 1400 further includes a plurality of fastener openings or holes 1450 defined in the base wall 1406 and extending between the front face 1404 and the rear face. Specifically, the device 1400 includes a central fastener hole 1450a which is generally centered on the base wall 1406, and first, second and third outer or offcentered fastener holes 1450b, 1450c, 1450d disposed in a triangular pattern around the central hole 250a. Still in the embodiment illustrated in FIGS. 14 and 15, the first, second and third offcentered fastener holes 1450b, 1450c, 1450d are spread out generally evenly around the central fastener hole 1450a. More specifically, the first offcentered fastener hole 1450b and the central fastener hole 1450a are disposed along a third axis $A_3$, the second offcentered fastener hole 1450c and the central fastener hole 1450a are disposed along a fourth axis $A_4$ and the third offcentered fastener hole 1450d and the central fastener hole 1450a are disposed along a fifth axis $A_5$, and the first, second and third axes $A_3$, $A_4$, $A_5$ are angled from each other at an angle θ of 120 degrees. Alternatively, the offcentered fastener holes 1450b, 1450c, 1450d may not be spaced evenly around the central fastener hole 1450a.

Furthermore, in the embodiment illustrated in FIGS. 14 and 15, each offcentered fastener hole 1450b, 1450c, 1450d has a common first opening diameter and the central fastener hole 1450a has a second opening diameter which is larger than the first opening diameter. Alternatively, all of the holes 1450 may have the same diameter, similarly to the holes 250 described above, or may have different diameters from each other.

It will be understood that instead of the configurations described above, the wall attachment device may have one of various alternative configurations. For example, the wall attachment device may have less than four fastener holes or more than five fastener holes, and the fastener holes may be disposed on the wall attachment device according to any pattern which a skilled person may consider to be appropriate.

Referring now to FIGS. 16 to 20, there is shown a handrail assembly 1600, in accordance with another embodiment. The handrail assembly 1600 includes a wall attachment device 1602 for securing a handrail 1604 to a supporting wall. The handrail 1604 is connected to the device 1602 using a 90-degree connection piece 1606. As explained above, this type of connection piece allows the handrail 1604 to be mounted in a grab bar configuration.

The wall attachment device 1602 is generally similar to the wall attachment device 1400 illustrated in FIGS. 14 and 15 and described above and includes a central fastener hole and three offcentered fastener holes.

In the embodiment illustrated in FIGS. 16 to 20, the wall attachment device is not directly in contact with the supporting wall. Instead, the handrail assembly 1600 includes a base plate 1608 configured to be received between the supporting wall and the wall attachment device 1602. More specifically, the base plate 1608 includes a rear plate face 1610 adapted to be placed against the supporting wall and a front plate face 1612 opposite the rear plate face 1610 for receiving the wall attachment device 1602.

Figure 16:
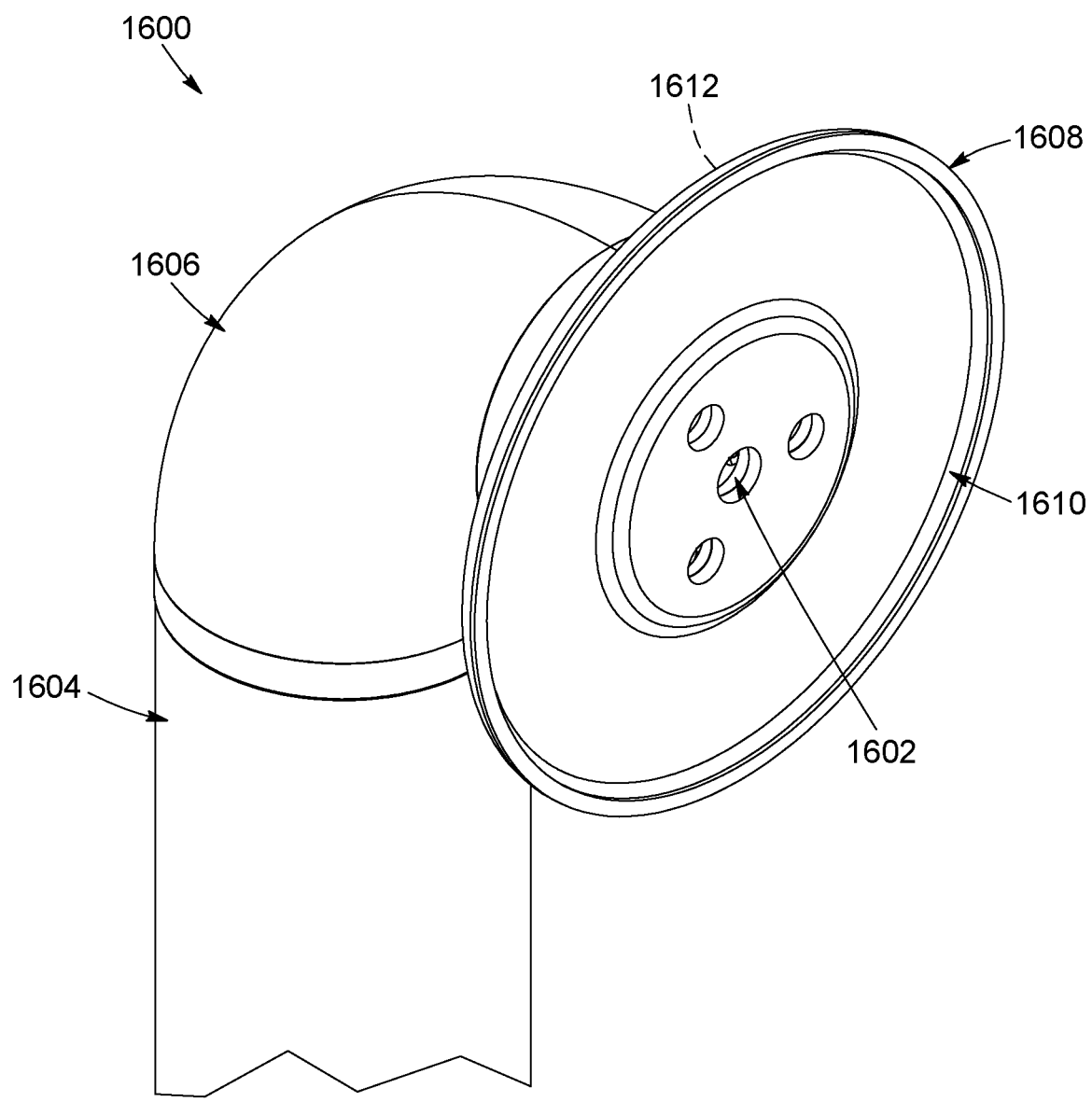
FIG. 16 is a partial perspective view of a handrail assembly including a wall attachment device, in accordance with one embodiment, further including a base plate disposed over the wall attachment device.
Figure 17:
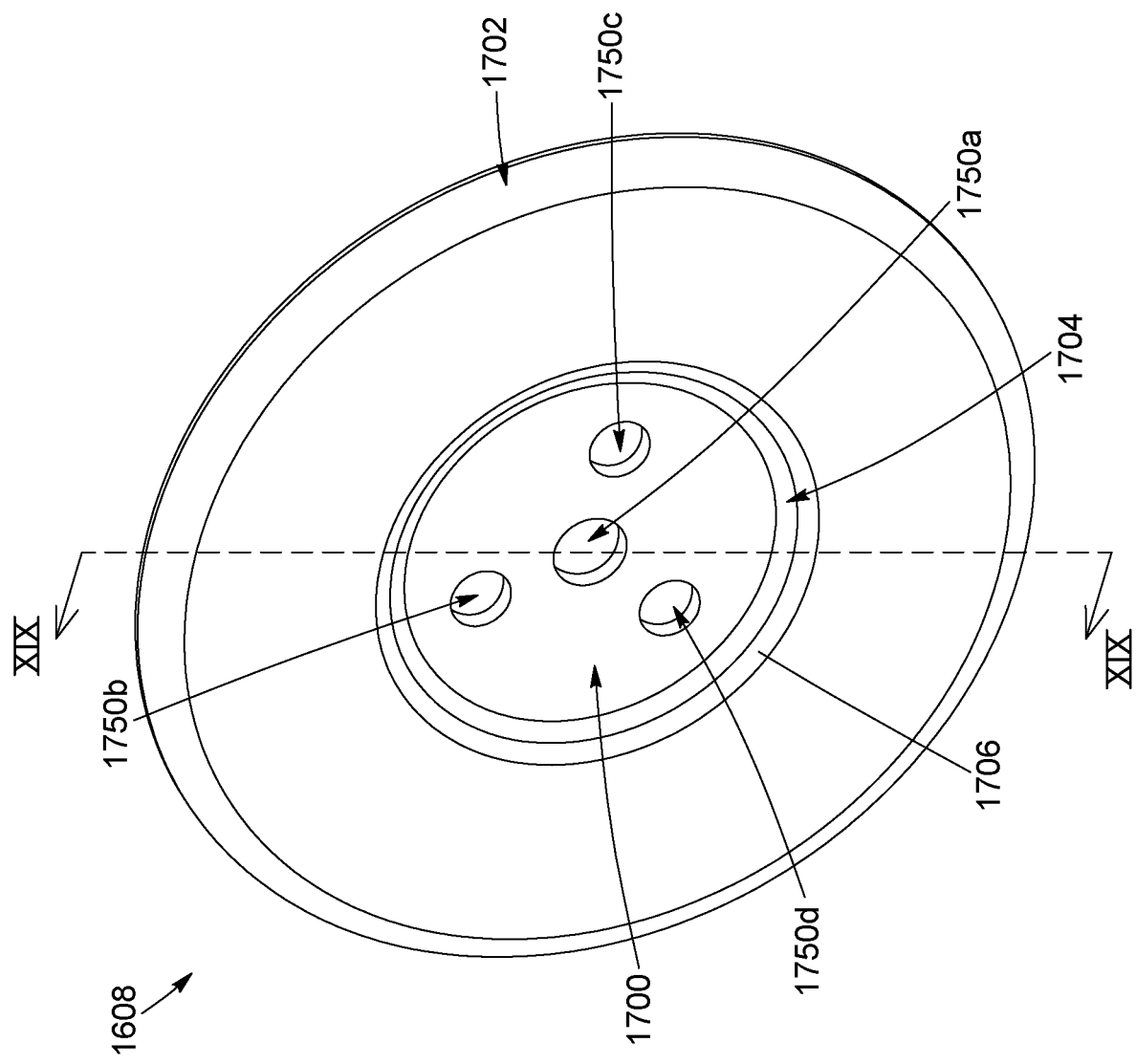
FIG. 17 is a front perspective view of the base plate illustrated in FIG. 16.
Figure 18:
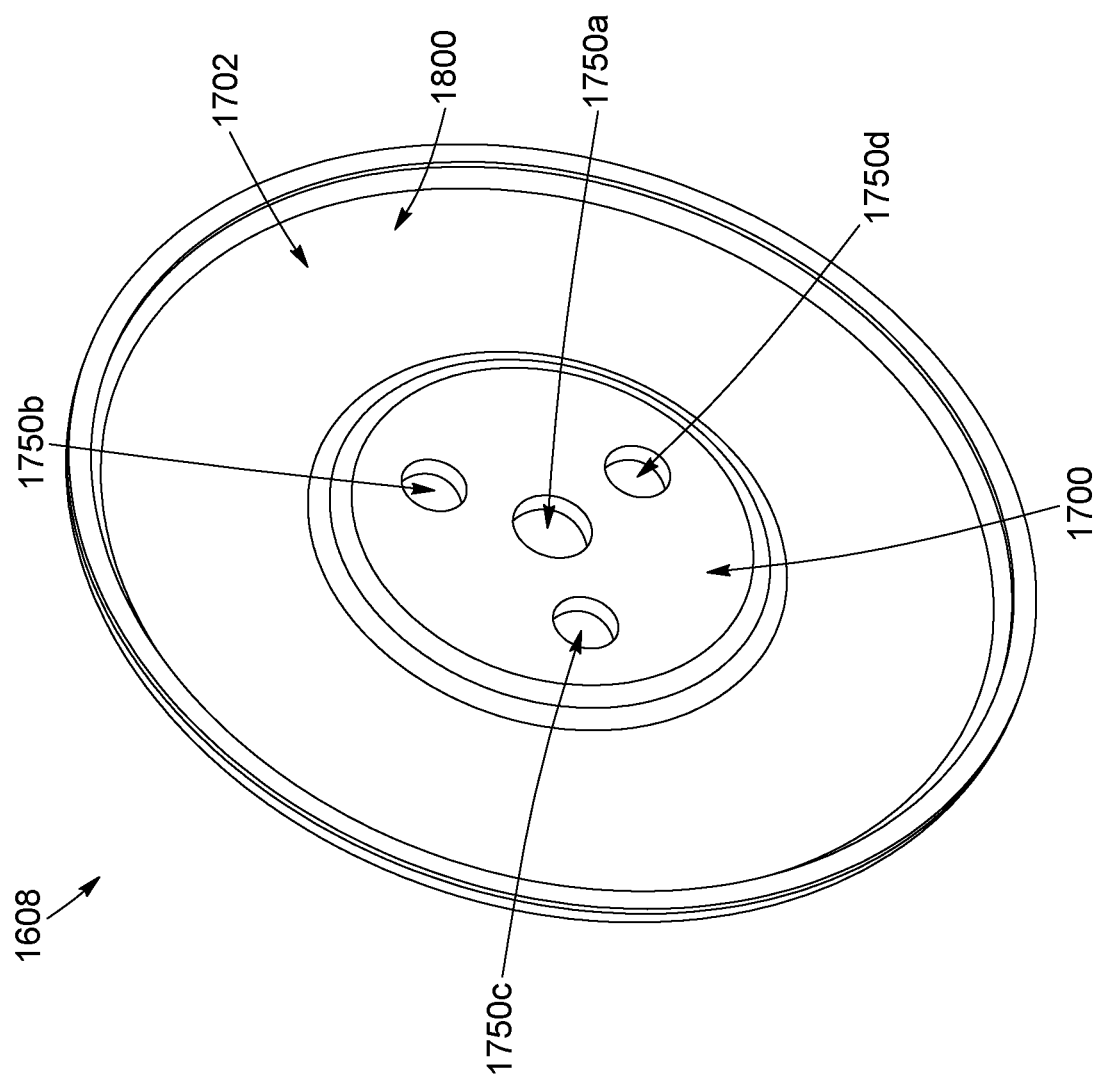
FIG. 18 is a rear perspective view of the base plate illustrated in FIG. 16.

As shown in FIG. 16, the base plate 1602 has a diameter which is larger than the diameter of the connection piece 1606 and of the handrail 1604. It will be appreciated that this may allows the base plate 1602 to distribute forces applied to the grab bar to a larger surface area on the supporting wall to thereby enhance the rigidity of the connection between the grab bar and the wall and prevent damage to the wall.

Figure 19:
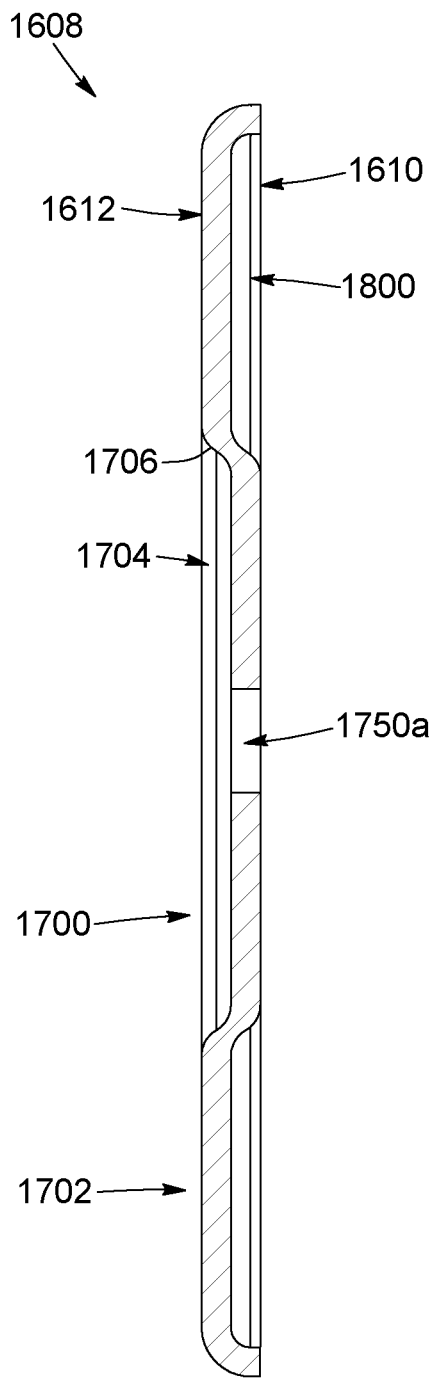
FIG. 19 is a cross-section view, taken along cross-section line XIX-XIX, of the base plate illustrated in FIG. 17.

Still referring to FIGS. 16 to 20, the base plate 1608 includes a central portion 1700 and a lateral portion 1702 extending radially outwardly from the central portion 1700. The central portion 1700 is further configured for receiving the wall attachment device 1602. More specifically, the base plate 1608 includes a central recess 1704 extending from the front plate face 1612 towards the rear plate face 1610. The central recess 1704 is sized and shaped to matingly receive the wall attachment device 1602. More specifically, the central recess 1704 has a recess sidewall 1706 which has a generally S-shaped cross-section, as best shown in FIG. 19, for snuggly receiving the wall attachment device 1602. Alternatively, the base plate 1608 may not include a central recess 1704 and the wall attachment device 1602 may simply be placed against the front plate face 1612.

Still referring to FIGS. 16 to 20, the base plate 1608 further includes an annular recess 1800 extending from the rear plate face 1610 towards the front plate face 1612. Alternatively, the base plate 1608 may not include an annular recess and the rear plate face 1610 may instead be completely planar.

Still referring to FIGS. 16 to 20, the central portion 1700 includes a plurality of fastener holes 1750 which correspond to the fastener holes of the wall attachment device 100. More specifically, the central portion 1700 includes a central fastener hole 1750a and three offcentered fastener holes 1750b, 1750c, 1750d. The fastener holes 1750 are further disposed on the central portion 1700 in a pattern corresponding to the pattern of the fastener holes of the wall attachment device 1602 such that they may be aligned with the fastener holes of the wall attachment device 1602. In this configuration, the base plate 1608 and the wall attachment device 1602 may be secured simultaneously to the supporting wall using fasteners extending through both the base plate 1608 and the wall attachment device 1602.

To assembly the handrail assembly 1600, the base plate 1608 may first be placed at a desired location against the supporting wall and the wall attachment device 1602 may be placed in the central recess 1704 with the fastener holes of the base plate 1608 aligned with the fastener holes of the wall attachment device 1602. The device 1602 and the base plate 1608 may then be secured to the supporting wall using one or more fasteners extending through corresponding fastener holes of the wall attachment device 1602 and the base plate 1608. The connection piece 1606 and the handrail 1604 may then be connected as described above.

It will be appreciated that the arrangements described above are merely provided as examples, and that various alternative configurations may be considered. For example, the handrail and the connecting piece may have a rectangular cross-section instead of a circular cross-section, in which case the wall attachment device may be similarly rectangular. Alternatively, the handrail and/or connecting piece may have any other suitable cross-sectional shape and the wall attachment device may have a corresponding shape.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A wall attachment assembly for securing a handrail to a supporting wall, the handrail having a first end and a second end, the attachment assembly comprising:
  a hollow connection piece including a first half portion and a second half portion distinct from the first half portion, the first and second half portions being positionable against each other and securable for engaging one of the first and second ends of the handrail, the connection piece including an inner connecting member extending radially inwardly from at least one of the first and second half portions;
  a wall attachment device for connecting the connection piece to the supporting wall, the wall attachment device including:
    a body sized and shaped to be received in the connection piece, the body including a planar rear face adapted to be positioned against the supporting wall, a front face opposite the rear face and a lateral face, the body further having at least one fastener opening extending between the front and rear faces, each fastener opening being adapted to receive a fastener for securing the body to the supporting wall; and
    an outer connecting member extending radially outwardly from the lateral face for securely engaging the inner connecting member of the connection piece to thereby attach the corresponding one of the first and second ends of the handrail to the supporting wall.

2. The assembly as claimed in claim 1, wherein the body includes:
  a flat base wall defining the rear and front faces of the body; and
  a sidewall extending away from the base wall, the sidewall being disposed away from the rear face so as to extend away from the supporting wall when the rear face is positioned against the supporting wall, the sidewall defining the lateral face.

3. The assembly as claimed in claim 2, wherein the sidewall includes a first sidewall end located towards the base wall and a second sidewall end located away from the base wall, the outer connecting member including a rim surrounding the sidewall, the rim being spaced away from the base wall and being located at the second sidewall end.

4. The assembly as claimed in claim 3, wherein the sidewall has an S-shaped cross-section.

5. The assembly as claimed in claim 1, wherein the at least one fastener openings include a central fastener opening.

6. The assembly as claimed in claim 5, wherein the at least one fastener opening further includes a plurality of offcentered fastener openings disposed around the central fastener opening.

7. The assembly as claimed in claim 6, wherein each offcentered fastener opening has a first opening diameter and the central fastener opening has a second opening diameter larger than the first opening diameter.

8. The assembly as claimed in claim 6, wherein the plurality of offcentered fastener openings includes first, second, third and fourth offcentered fastener openings, the first offcentered fastener opening, the second offcentered fastener opening and the central fastener opening being disposed along a first axis, and the third offcentered fastener opening, the fourth offcentered fastener opening and the central fastener opening being disposed along a second axis perpendicular to the first axis.

9. The assembly as claimed in claim 6, wherein the plurality of offcentered fastener openings includes first, second and third offcentered fastener openings, the first offcentered fastener opening and the central fastener opening being disposed along a first axis, the second offcentered fastener opening and the central fastener opening being disposed along a second axis and the third offcentered fastener opening and the central fastener opening being disposed along a third axis, the first, second and third axes being angled from each other at an angle of 120 degrees.

10. The assembly as claimed in any claim 1, wherein the body is circular.

11. The assembly as claimed in claim 1, wherein the connection piece includes a connection piece sidewall having a first end configured to be disposed towards the handrail and a second end adapted to be disposed towards the device, the connection piece further including an end wall extending orthogonally to the connection piece sidewall at the first end of the connection piece sidewall and an inner lip extending radially inwardly from the connection piece sidewall near the second end of the connection piece sidewall, the end wall and the inner lip being spaced apart to receive the outer connecting member therebetween.

12. The assembly as claimed in claim 1, further comprising a base plate configured to be received between the supporting wall and the wall attachment device, the base plate including a front plate face and a rear plate face, the base plate including a central portion and a lateral portion extending radially outwardly from the central portion, the central portion including at least one fastener opening, the central portion being configured for receiving the rear face of the wall attachment device such that each fastener opening is aligned with a corresponding fastener opening of the wall attachment device.

13. The assembly as claimed in claim 12, wherein the base plate includes a central recess extending from the front plate face towards the rear plate face, the central recess being sized and shaped to matingly receive the wall attachment device.

14. The assembly as claimed in claim 12, wherein the connection piece has a first diameter and the lateral portion of the base plate has a second diameter larger than the first diameter.

15. A handrail assembly comprising:
  a handrail having a first end and a second end;
  a connection piece including a first half portion and a second half portion distinct from the first half portion, the first and second half portions being positionable against each other and securable together for engaging one of the first and second ends of the handrail, the connection piece including an inner connecting member extending radially inwardly from at least one of the first and second half portions;

a wall attachment device for connecting the connection piece to a supporting wall, the wall attachment device including:
  a body sized and shaped to be received in the connection piece, the body including a planar rear face adapted to be positioned against the supporting wall, a front face opposite the rear face and a lateral face, the body further having at least one fastener opening extending between the front and rear faces, each fastener opening being adapted to receive a fastener for securing the body to the supporting wall; and
  an outer connecting member extending radially outwardly from the lateral face for securely engaging the inner connecting member of the connection piece to thereby attach the corresponding one of the first and second ends of the handrail to the supporting wall.

16. The handrail assembly as claimed in claim 15, wherein the body includes:
  a flat base wall defining the rear and front faces of the body; and
  a sidewall extending away from the base wall, the sidewall being disposed away from the rear face so as to extend away from the supporting wall when the rear face is positioned against the supporting wall, the sidewall defining the lateral face.

17. The handrail assembly as claimed in claim 16, wherein the sidewall includes a first sidewall end located towards the base wall and a second sidewall end located away from the base wall, the outer connecting member including a rim surrounding the sidewall, the rim being spaced away from the base wall and being located at the second sidewall end.

18. The handrail assembly as claimed in claim 17, wherein the sidewall has an S-shaped cross-section.

19. The handrail assembly as claimed in claim 15, wherein the at least one fastener openings include a central fastener opening.

20. The handrail assembly as claimed in claim 19, wherein the at least one fastener opening further includes a plurality of offcentered fastener openings disposed around the central fastener opening.

21. The handrail assembly as claimed in claim 20, wherein each offcentered fastener opening has a first opening diameter and the central fastener opening has a second opening diameter larger than the first opening diameter.

22. The handrail assembly as claimed in claim 20, wherein the plurality of offcentered fastener openings includes first, second, third and fourth offcentered fastener openings, the first offcentered fastener opening, the second offcentered fastener opening and the central fastener opening being disposed along a first axis, and the third offcentered fastener opening, the fourth offcentered fastener opening and the central fastener opening being disposed along a second axis perpendicular to the first axis.

23. The handrail assembly as claimed in claim 20, wherein the plurality of offcentered fastener openings includes first, second and third offcentered fastener openings, the first offcentered fastener opening and the central fastener opening being disposed along a first axis, the second offcentered fastener opening and the central fastener opening being disposed along a second axis and the third offcentered fastener opening and the central fastener opening being disposed along a third axis, the first, second and third axes being angled from each other at an angle of 120 degrees.

24. The handrail assembly as claimed in claim 15, wherein the body is circular.

* * * * *

UNITED STATES PATENT AND TRADEMARK OFFICE
CERTIFICATE OF CORRECTION

| | | |
|---|---|---|
| PATENT NO. | : 11,414,873 B2 | |
| APPLICATION NO. | : 16/646588 | |
| DATED | : August 16, 2022 | |
| INVENTOR(S) | : Warshaw | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 174 days.

Signed and Sealed this
First Day of October, 2024

*Katherine Kelly Vidal*

Katherine Kelly Vidal
*Director of the United States Patent and Trademark Office*